United States Patent
Frankkila et al.

(10) Patent No.: US 11,172,411 B2
(45) Date of Patent: Nov. 9, 2021

(54) METHODS AND APPARATUS FOR ADJUSTING A SERVICE CONTINUITY THRESHOLD IN A WIRELESS COMMUNICATION NETWORK

(71) Applicant: Telefonaktiebolaget LM Ericsson (publ), Stockholm (SE)

(72) Inventors: Tomas Frankkila, Luleå (SE); George Foti, Dollard des Ormeaux (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 9 days.

(21) Appl. No.: 16/469,003

(22) PCT Filed: Dec. 11, 2017

(86) PCT No.: PCT/EP2017/082223
§ 371 (c)(1),
(2) Date: Jun. 12, 2019

(87) PCT Pub. No.: WO2018/108813
PCT Pub. Date: Jun. 21, 2018

(65) Prior Publication Data
US 2019/0364465 A1  Nov. 28, 2019

Related U.S. Application Data

(60) Provisional application No. 62/432,959, filed on Dec. 12, 2016.

(51) Int. Cl.
*H04W 4/00* (2018.01)
*H04W 36/00* (2009.01)
(Continued)

(52) U.S. Cl.
CPC ....... *H04W 36/0022* (2013.01); *H04W 24/04* (2013.01); *H04W 36/00837* (2018.08); *H04W 36/18* (2013.01)

(58) Field of Classification Search
CPC ............ H04W 24/04; H04W 36/0022; H04W 36/00837; H04W 36/18
See application file for complete search history.

(56) References Cited

U.S. PATENT DOCUMENTS 9,386,497 B1  7/2016 Sitaram et al.
2010/0017509 A1  1/2010 Frankkila et al.
(Continued)

FOREIGN PATENT DOCUMENTS

CN  104936246 A  9/2015

OTHER PUBLICATIONS

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0, Sep. 2016, 1-379.
(Continued)

*Primary Examiner* — Minh Trang T Nguyen
(74) *Attorney, Agent, or Firm* — Murphy, Bilak & Homiller, PLLC

(57) ABSTRACT

In one aspect, this disclosure details methods and apparatuses for influencing the service continuity threshold used for switching a multimedia session between Packet-Switched (PS) transport and Circuit-Switched (CS) transport, in dependence on the "robustness" of the media configuration in use for the multimedia session. Robustness, for example, may be defined in terms of packet loss tolerance, and it will be understood that the media configurations available for a given multimedia session may have different levels of absolute or relative robustness and that the media configuration selected for use in a multimedia session may change during the multimedia session. Correspondingly, the approaches proposed herein provide mechanisms for (Continued)

dynamically adjusting the service continuity threshold in dependence on which media configuration is currently in use for the multimedia session.

17 Claims, 11 Drawing Sheets

(51) Int. Cl.
*H04W 24/04* (2009.01)
*H04W 36/18* (2009.01)

(56) References Cited

U.S. PATENT DOCUMENTS

| | | | |
|---|---|---|---|
| 2012/0109971 A1* | 5/2012 | Jellison, Jr. | G06F 16/435 707/748 |
| 2012/0331508 A1* | 12/2012 | Vare | H04L 65/4076 725/50 |
| 2013/0100887 A1 | 4/2013 | Kim | |
| 2014/0064156 A1* | 3/2014 | Paladugu | H04W 36/0022 370/259 |
| 2014/0215152 A1* | 7/2014 | Cheng | H04N 21/2405 711/114 |
| 2016/0037390 A1 | 2/2016 | Mufti et al. | |
| 2017/0188270 A1* | 6/2017 | Shan | H04L 65/103 |

OTHER PUBLICATIONS

Unknown, Author, "3rd Generation Partnership Project; Technical Specification Group Radio Access Network; Evolved Universal Terrestrial Radio Access (E-UTRA); Study on Voice and Video enhancement for LTE (Release 14)", 3GPP TR 36.750 V14.0.0, Sep. 2019, pp. 1-28.

Unknown, Author, "3rd Generation Partnership Project; Technical Specification Group Services and System Aspects; Codec for Enhanced Voice Services (EVS); Detailed Algorithmic Description (Release 13)", 3GPP TS 26.445 V13.3.0, Sep. 2016, pp. 1-24.

Unknown, Author, "3rd Generation Partnership Project; Technical Specification Group Services and System Aspects; Codec for Enhanced Voice Services (EVS); General Overview (Release 13) The present", 3GPP TS 26.441 V13.0.0, Dec. 2015, pp. 1-12.

Unknown, Author, "3rd Generation Partnership Project; Technical Specification Group Services and System Aspects; Codec for Enhanced Voice Services (EVS); Performance Characterization (Release 13)", 3GPP TR 26.952 V13.2.0, Jun. 2016, pp. 1-91.

Unknown, Author, "3rd Generation Partnership Project; Technical Specification Group Services and System Aspects; IP Multimedia Subsystem (IMS); Multimedia Telephony; Media handling and interaction (Release 14)", 3GPP TS 26.114 V14.1.0, Sep. 2016, pp. 1-373.

Unknown, Author, "3rd Generation Partnership Project; Technical Specification Group Services and System Aspects; Mandatory speech CODEC speech processing functions; AMR speech CODEC; General description (Release 13)", 3GPP TS 26.071 V13.0.0, Dec. 2015, pp. 1-12.

Unknown, Author, "3rd Generation Partnership Project; Technical Specification Group Services and System Aspects; Policy and charging control architecture (Release 14)", 3GPP TS 23.203 V14.1.0, Sep. 2016, pp. 1-253.

Unknown, Author, "3rd Generation Partnership Project; Technical Specification Group Services and System Aspects; Speech codec speech processing functions; Adaptive Multi-Rate—Wideband (AMR-WB) speech codec; General description (Release 13)", 3GPP TS 26.171 V13.0.0, pp. 1-12.

Unknown, Author, "IMS Profile for Voice and SMS", GSM Association, Non-confidential, Official Document IR.92 V11.0, Jun. 15, 2017, pp. 1-57.

Unknown, Author, "On eNS awareness of EVS codec for coverage and mobility enhancements", 3GPP TSG-RAN2 meeting #95, R2-165194, Gothenburg, Sweden,, Aug. 22-26, 2016, pp. 1-11.

Unknown, Author, "3rd Generation Partnership Project; Technical Specification Group Services and System Aspects; Codec for Enhanced Voice Services (EVS); General Overview (Release 14)", 3GPP TS 26.441 V14.0.0, Mar. 2017, 12 pages.

Unknown, Author, "3rd Generation Partnership Project; Technical Specification Group Services and System Aspects; Codec for Enhanced Voice Services (EVS); Performance Characterization (Release 14)", 3GPP TR 26.952 V14.0.0, Mar. 2017, 92 pages.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.1.0, Sep. 2017, 397 pages.

Unknown, Author, "3rd Generation Partnership Project; Technical Specification Group Services and System Aspects; IP Multimedia Subsystem (IMS); Multimedia Telephony; Media handling and interaction (Release 15)", 3GPP TS 26.114 V15.0.0, Sep. 2017, 393 pages.

Unknown, Author, "3rd Generation Partnership Project; Technical Specification Group Services and System Aspects; Mandatory speech CODEC speech processing functions; AMR speech CODEC; General description (Release 14)", 3GPP TS 26.071 V14.0.0, Mar. 2017, 12 pages.

Unknown, Author, "3rd Generation Partnership Project; Technical Specification Group Services and System Aspects; Policy and charging control architecture (Release 15)", 3GPP TS 23.203 V15.0.0, Sep. 2017, 257 pages.

Unknown, Author, "3rd Generation Partnership Project; Technical Specification Group Services and System Aspects; Speech codec speech processing functions; Adaptive Multi-Rate—Wideband (AMR-WB) speech codec; General description (Release 14)", 3GPP TS 26.171 V14.0.0, Mar. 2017, 12 pages.

\* cited by examiner

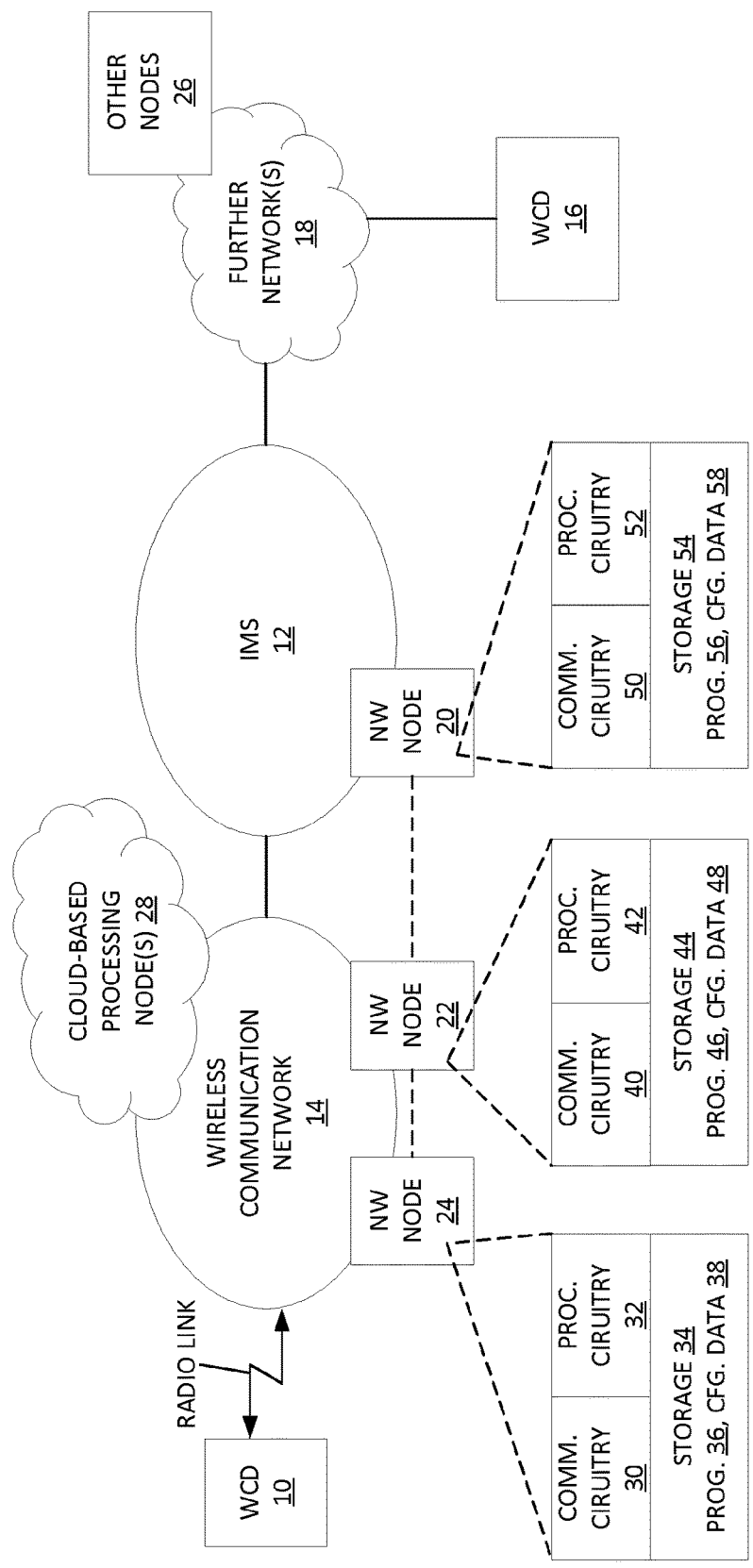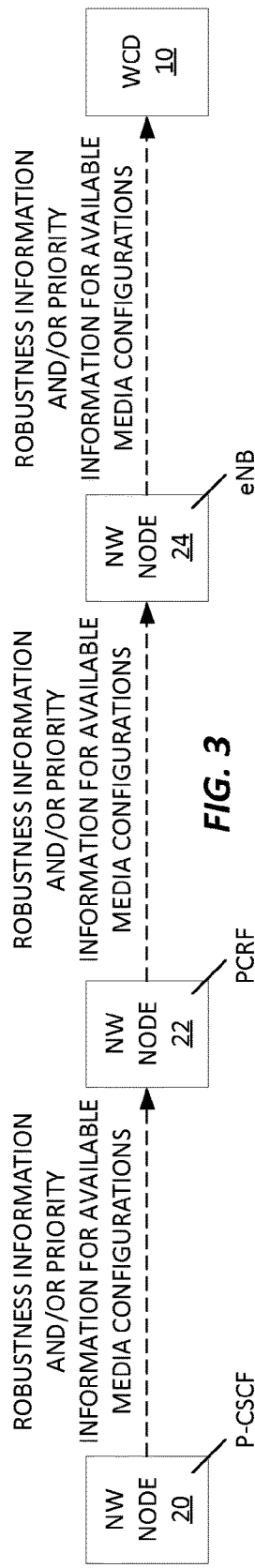

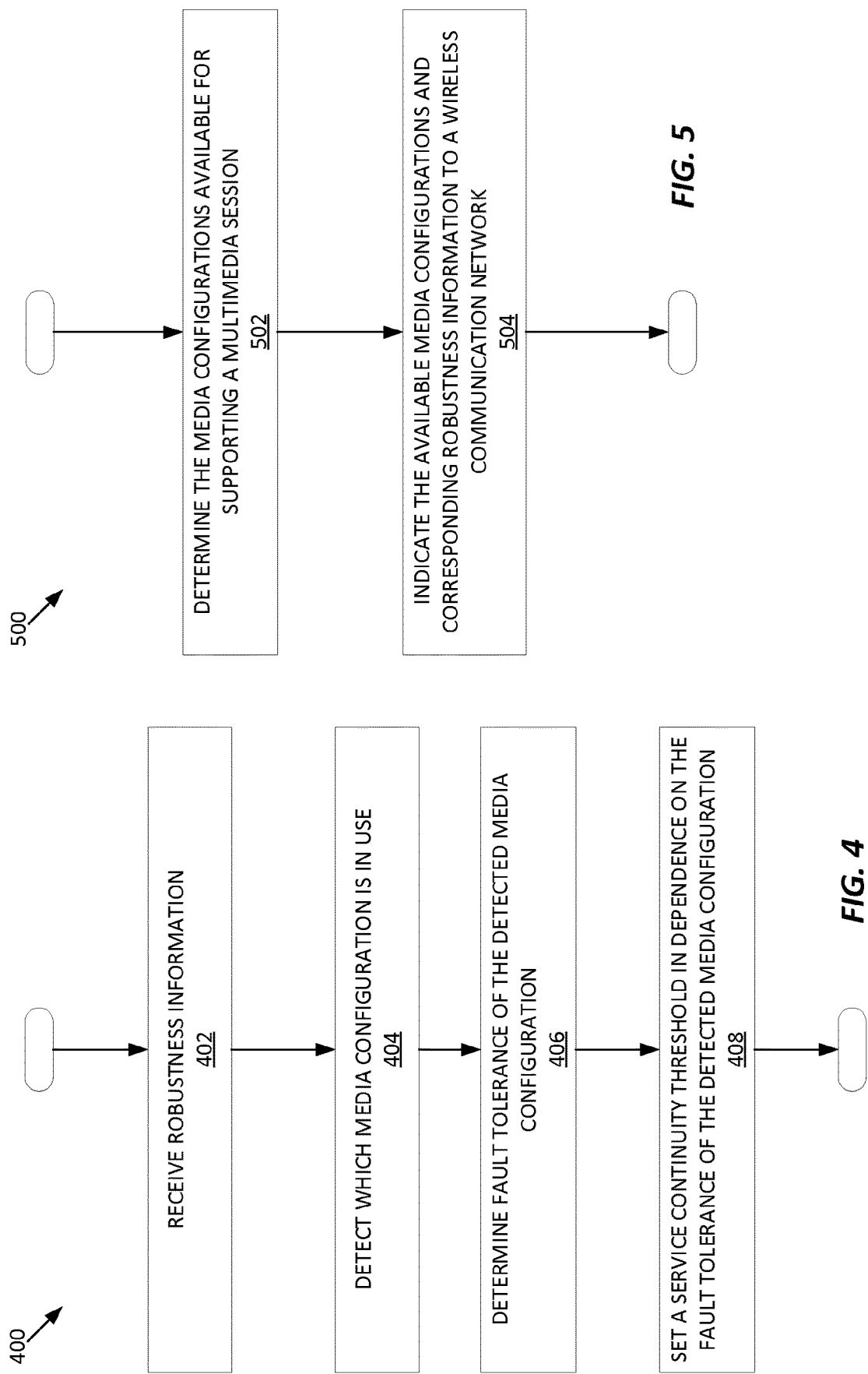

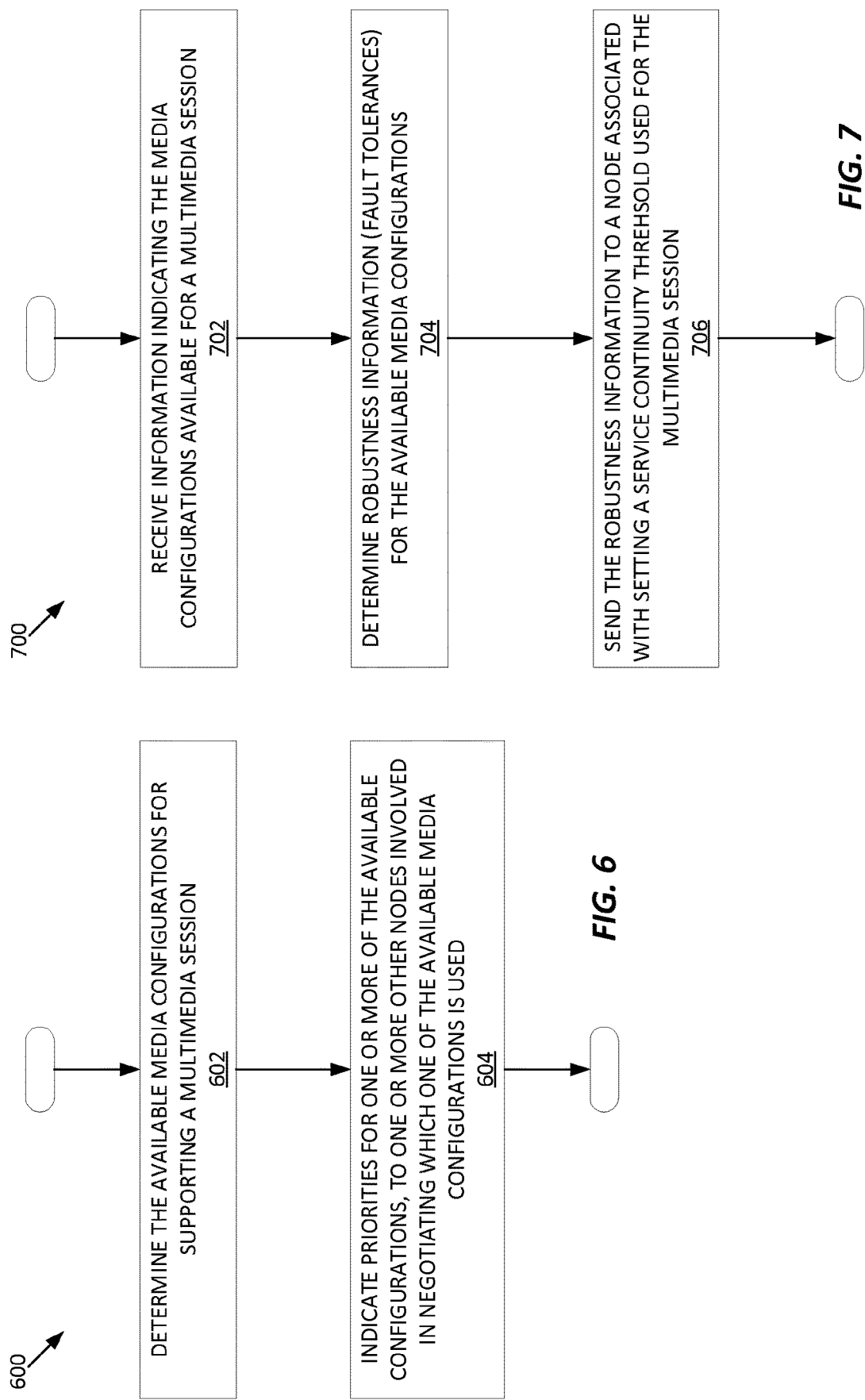

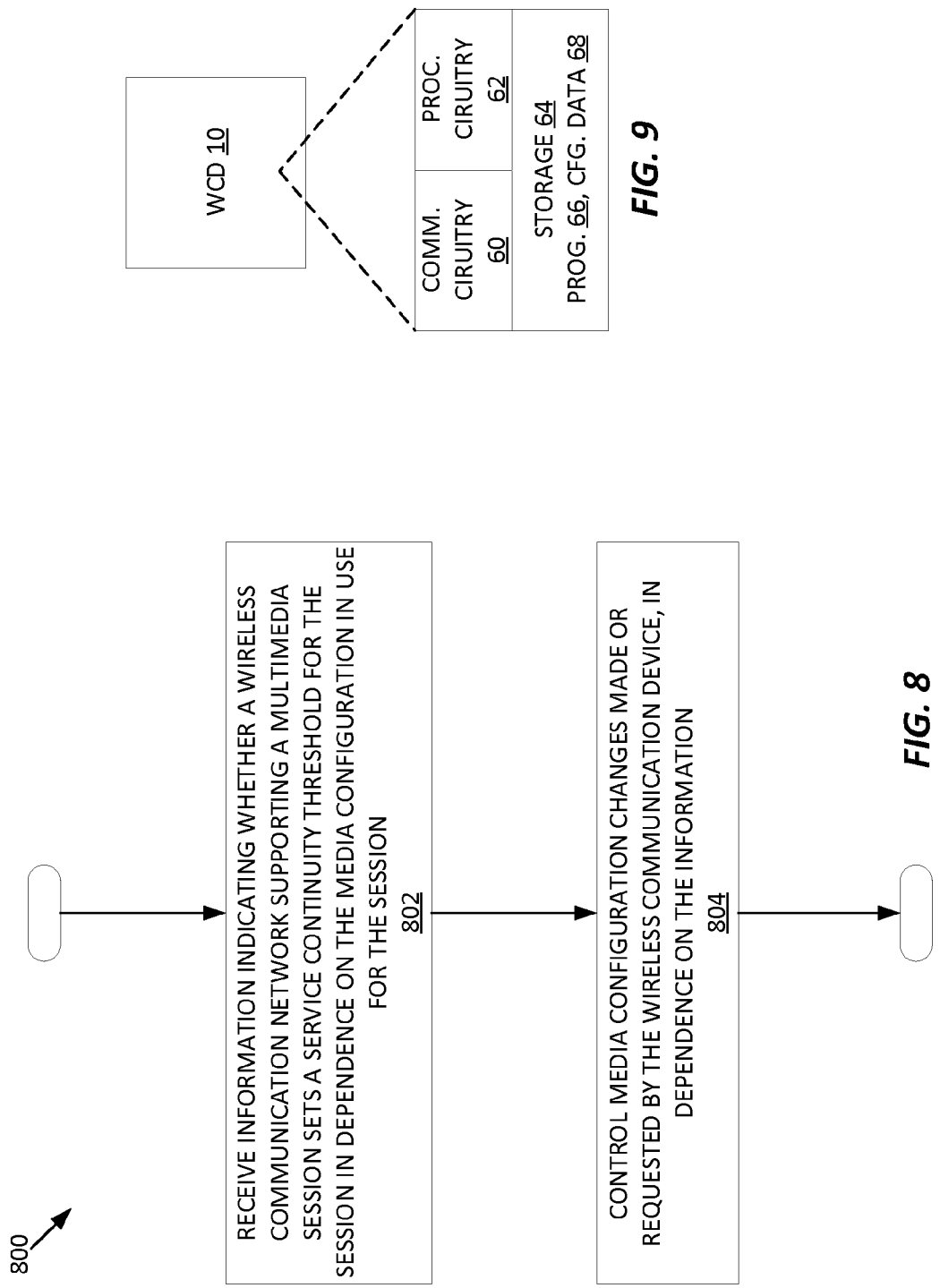

| Media configuration (codec) | Tag type | Tag value | QFT | Priority |
|---|---|---|---|---|
| AMR | RTP payload type number | 96 | 1 | 3 |
| AMR-WB | RTP payload type number | 97 | 1 | 2 |
| EVS 13.2 kbps channel-aware mode | RTP payload type number | 98 | 5 | 1 |

*FIG. 10*

| Tag | QFT | Threshold Parameters |
|---|---|---|
| 96, 97 | 1 | RAN specific parameter 1 |
| - not used | 2 | RAN specific parameter 2 |
| 99 | 3 | RAN specific parameter 3 |
| 100, 101, 102 | 4 | RAN specific parameter 4 |
| 98 | 5 | RAN specific parameter 5 |

| Media configuration (codec + codec configuration) | Tag type | Tag value | QFT | Priority |
|---|---|---|---|---|
| AMR | RTP payload type number: | 96 | 1 | 4 |
| AMR-WB | RTP payload type number: | 97 | 1 | 3 |
| EVS 13.2 kbps channel-aware mode | Combination of:<br>* RTP payload type number:<br>* RTP packet size: | 98<br>=45 bytes | 5 | 1 |
| EVS 5.9-13.2 kbps (non-channel-aware mode) | Combination of:<br>* RTP payload type number:<br>* RTP packet size: | 98<br><>45 bytes | 1 | 2 |

FIG. 13

| Media configuration (codec + codec configuration) | Tag type | Tag value(s) | QFT | Priority |
|---|---|---|---|---|
| EVS 13.2 kbps channel-aware mode | Combination of:<br>* Codec<br>* Frame Type index | "EVS"<br>000100 | 5 | 1 |
| EVS 9.6 kbps (non-channel-aware mode) | Combination of:<br>* Codec<br>* Frame Type index | "EVS"<br>000011 | 1 | 2 |
| EVS 8.0 kbps (non-channel-aware mode) | Combination of:<br>* Codec<br>* Frame Type index | "EVS"<br>000010 | 1 | 2 |
| EVS 7.2 kbps (non-channel-aware mode) | Combination of:<br>* Codec<br>* Frame Type index | "EVS"<br>000001 | 1 | 2 |
| EVS 5.9 kbps (non-channel-aware mode) | Combination of:<br>* Codec<br>* Frame Type index | "EVS"<br>000000,<br>000001,<br>000010 | 1 | 2 |

METHODS AND APPARATUS FOR ADJUSTING A SERVICE CONTINUITY THRESHOLD IN A WIRELESS COMMUNICATION NETWORK

TECHNICAL FIELD

The present invention generally relates to wireless communication networks and particularly relates to service continuity for multimedia sessions when changing between circuit-switched and packet-switched transport.

BACKGROUND

Third Generation Partnership (3GPP) radio access networks (RANs) allow for handover between packet-switched (PS) transport and circuit-switched (CS) transport for voice calls. This functionality is called Single Radio Voice Call Continuity (SRVCC) and allows for maintaining a call even if the PS coverage is limited. For example, when a user initiates a voice call where there is good Long Term Evolution (LTE) coverage then the system would start as a Voice over LTE (VoLTE) call using PS transport—see GSMA PRD IR.92 v11.0. If the user then moves into an area with poor or no LTE coverage then the system would initiate an SRVCC handover to CS transport to maintain the call. Handover to CS transport is an important feature because dropped calls are annoying and reduce customer satisfaction.

The SRVCC handover is controlled by comparing the current radio conditions with an SRVCC handover (HO) threshold, which may be expressed as a signal quality or strength threshold. If LTE is used and the radio conditions deteriorate to be worse than the SRVCC handover threshold, then the system initiates an SRVCC handover and moves the call to CS. The SRVCC handover threshold is currently statically configured. This is because most codecs that are used in voice calls, such as Adaptive Multi Rate (AMR) and AMR-Wideband (WB), have about the same sensitivity to voice frame losses, which are caused by packet losses. See 3GPP TS 26.071 v.13.0.0 regarding AMR details and 3GPP TS 26.171 v.13.0.0 regarding AMR-WB details. A commonly used rule-of-thumb is that speech codecs need a packet loss rate (PLR) below 1-2% to give good speech quality and that the quality degrades rapidly with increasing PLR.

A new codec, the Enhanced Voice Service (EVS) codec, was recently standardized by 3GPP—see 3GPP TS 26.441 v.13.0.0. The EVS codec includes multiple bitrates for encoding, from 5.9 kbps up to 128 kbps. This offers similar rate adaptation capabilities as for AMR (4.75-12.2 kbps) and AMR-WB (6.6-23.85 kbps), which can be used to adapt the bitrate in response to different and varying channel conditions, which gives varying throughput. A difference between EVS and AMR/AMR-WB is that the EVS codec also includes the so-called Channel-Aware (CA) mode, which is available for the 13.2 kbps bitrate. EVS also provides for 13.2 kbps operation without use of CA mode.

CA mode encoding operates at a fixed bitrate, but it identifies speech frames that are candidates for encoding at a lower bit rate. The resulting spare bits available for the candidate frames are used to partially encode prior speech frames. Thus, the speech frame corresponding to a lost packet may nonetheless be decoded if the receiver successfully receives a subsequent frame carrying redundant data for the lost frame. This approach to redundancy offers better resilience against packet loss than what is available for the AMR and AMR-WB codecs and better resilience than offered by the other EVS bitrates. Tests have shown that quite good quality is maintained in channel-aware mode even for up to 5-10% frame loss rate. See, e.g., 3GPP TR 26.952 v13.2.0. The channel-aware mode is however only available for the 13.2 kbps bitrate.

The current VoLTE specification GSMA PRD IR.92 defines that AMR and AMR-WB are mandatory to support for narrowband and wideband speech, respectively. The EVS codec is mandatory if the UE supports super-wideband or fullband speech. However, since the EVS codec also supports narrowband and wideband speech, it can be used for these audio bandwidths, provided that the involved User Equipments (UEs) implement the EVS codec.

The Multimedia Telephony Service for IMS (MTSI) specification-3GPP TS 26.114 v.14.1.0 defines Real Time Protocol (RTP) based redundancy mechanisms where an encoded frame can be sent in several RTP packets. As an example, the method can be used for the AMR, AMR-WB and EVS codecs. The encoder at the involved client encodes frame N, and the client sends the frame multiple times, e.g. both in RTP packet number M and packet number M+1 (or M+m), where 'm' is the "offset" between the primary transmission and the redundant transmission. Such operations provide full redundancy in that the receiver need only receive one of the frames successfully, and the operation is much like that of other Forward Error Correction schemes commonly used in streaming media transmissions based on broadcasting or multicasting. It is also common for the encoder to reduce the bitrate when employing redundancy, to avoid increasing the transmission bandwidth.

This type of redundancy significantly increases the resilience against packet losses, although it is often required to use a lower bitrate to avoid exceeding the allocated maximum bandwidth. However, this mechanism is currently not used in VoLTE, although it could be added in a future release.

It is appreciated herein that one or both RTP-based redundancy mechanisms and the EVS channel-aware mode could be used to improve LTE coverage and avoid unnecessary SRVCC handovers of voice calls to CS. Such avoidance is beneficial because the SRVCC procedure takes some time, during which the transmission of voice frames is stopped. Stoppage causes a so-called "silence interruption" because the targeted receiver receives no voice frames to decode. Silence interruptions occurring during active speech cause significant audible distortion, which annoys the listener.

Another aspect considered herein is that users often use data services in the background, even when involved in a voice call. Data transmission is usually more resilient to poor channel conditions than voice calls because data transmissions have relaxed delay requirements. The relaxed delay requirements allow the RAN to use re-transmissions to maintain a low or zero packet loss rate. Consequently, data transmissions and voice calls have different coverage properties, and different SRVCC handover thresholds can be used with respect to data and voice.

The different resilience for voice and data means that a data transmission ongoing during poor radio conditions may be interrupted if the user starts a voice call, because the system will then immediately initiate an SRVCC handover to CS. In the worst case, the data transmission may even be terminated, and the user would need to re-start the data transmission, which is annoying. Therefore, it would be beneficial to use the above-described redundancy mechanisms to make the voice calls more robust and avoid or reduce SRVCC handovers.

To be able to use the redundancy mechanisms for the AMR, AMR-WB and EVS codecs, as described above, these mechanisms first need to be negotiated in the multimedia session setup between the end-points, e.g. between the UEs. This is because different VoLTE implementations may support different configurations. For example, legacy VoLTE UEs may support only AMR and AMR-WB, while newer VoLTE UEs may support AMR, AMR-WB and EVS, including the EVS channel-aware mode. Likewise, even if the RTP-based redundancy in MTSI is introduced in future releases of VoLTE, it will not be supported by older VoLTE UEs. As another point of complexity, even when EVS is supported, the CA mode may be disabled during the Session Description Protocol (SDP) offer/answer negotiation. Enabling or disabling CA mode could be done by the application of different operator policies in different networks.

In view of the above possibilities and complexities, it is recognized herein that different multimedia sessions or types of multimedia sessions would benefit from different SRVCC thresholds, or, more generally, different "service continuity" thresholds. The latter term highlights the fact that some multimedia sessions may not involve voice and instead may involve other types of media, e.g., music or other streaming media. At least some types of multimedia sessions are more tolerant of packet loss and using the same service continuity threshold for all multimedia sessions misses an opportunity to extend LTE coverage for those sessions that are more fault tolerant (robust).

Further, the "media configuration" being used for a multimedia session is set up as part of multimedia session establishment but may change during the multimedia session. Here, "media configuration" denotes the various parameters relating to encoding and transmission, such as coding rate, packet size, packet type, use or level of redundancy, etc. As an example, for a multimedia session supporting a voice call, the codec configuration(s) in use for the call at least partially defines the media configuration of the voice media being transported.

In view of the above possibilities and complexities, it is recognized herein that using the same service continuity thresholds for multimedia sessions involving different media configurations misses the opportunity to exploit the fact that some media configurations are more tolerant of packet loss, i.e., more robust, which would allow for the effective extension of LTE coverage for multimedia sessions using such configurations. It is also recognized herein that while multimedia session setup involves establishing an initial media configuration for the multimedia session, the media configuration may change during the multimedia session, e.g., in dependence on changing reception or coverage conditions at the respective communication endpoints, or in dependence on changes in which visited networks are involved in the multimedia session.

Consider current practices for Internet Protocol Multimedia Systems (IMS), which supports a variety of multimedia sessions, including voice and other streaming media that use one or more real time protocols. With general reference to FIG. 1, current IMS session setup and bearer allocation works per the following general details, for the illustrated context. That context includes the following assumptions: (1) the communication endpoints involved in the multimedia session (call) are denoted as "UE A" and "UE B"; (2) each UE is supported by a respective IMS, denoted as IMS-A and IMS-B; (3) each UE accesses its respective IMS domain through a respective RAN, denoted as RAN-A and RAN-B; (4) each RAN couples to the respective IMS domain through a Core Network (CN), which here includes at least a Packet Gateway (PGW) that includes or is associated with a Policy and Charging Enforcement Function (PCEF) and a Policy and Charging Rules Function (PCRF); and (5) the respective IMSs include an Application Function (AF) that supports the call, including negotiating the multimedia session setup, and here it will be understood that the illustrated AFs operate as Proxy Call Session Control Functions (P-CSCFs) within the respective IMS domains.

For multimedia session setup and bearer allocation in the example context of a voice call, the P-CSCFs analyze the Session Description Protocol (SDP) offered from the calling party and the SDP answer from the called party to determine which codec(s) and codec configuration(s) are negotiated. Referring to operations involving the UE A, the P-CSCF in the IMS-A domain translates the negotiated media configuration into bandwidth requirements, which are sent to the PCRF. The P-CSCF may also apply operator policies, for example to remove undesired codecs from the SDP negotiation or to apply certain codec configurations.

The PCRF uses the information it receives from the P-CSCF when applying operator policies and assigning the Quality-of-Service (QoS) parameters that will be used for the multimedia session. The QoS parameters include, for example, QCI, which denotes QoS Class Identifier. The QCI refers to the Standardized QCI characteristics defined in 3GPP TS 23.203 v14.1.0. For voice call sessions, the QCI is set to a value of '1'. Other example QoS parameters include Maximum Bit Rate (MBR), Guaranteed Bit Rate (GBR), etc.

Once the QoS parameters are selected or defined, they are sent to the RAN via the PCEF. In turn, the RAN uses the QoS parameters for admission control and bearer setup of the party it is supporting. In the FIG. 1 example, the RAN-A would receive such information from the IMS-A via the associated CN, and apply it for the UE A, while the RAN-B would receive such information from the IMS-B via the associated CN, and apply it for the UE B. The respective RANs send the QoS parameters to the corresponding UEs.

The 3GPP Technical Specification, TS 23.203, defines the mapping from QCI to Packet Delay Budget (PDB) and Packet Error Loss Rate (PELR). For example, for conversational voice (QCI=1), the PDB should be below 100 milliseconds (ms) and the PELR should be below 1%. The involved RAN uses such information when setting the SRVCC handover threshold. As observed above, and as recognized herein, these QoS parameters are set at call setup and remain the same until the end of the call, or until there is a session re-negotiation. Consequently, the SRVCC handover threshold per conventional practice remains static for the multimedia session, and that practice misses valuable opportunities to adjust the SRVCC handover threshold, or, in more general terms, misses the opportunity to adjust the service continuity threshold used to control switchover between PS-transport and CS-transport for any given multimedia session. While making the RAN "codec aware" stands as a known proposal, it is recognized herein that knowing which codec is used for a multimedia session is not sufficient for the RAN to make appropriate adjustments to the service continuity threshold used for the multimedia session.

SUMMARY

In one aspect, this disclosure details methods and apparatuses for influencing the service continuity threshold used for switching a multimedia session between Packet-Switched (PS) transport and Circuit-Switched (CS) transport, in dependence on the "robustness" of the media configuration in use for the multimedia session. Robustness, for example, may be defined in terms of packet loss tolerance, and it will be understood that the media configurations available for a given multimedia session may have different levels of absolute or relative robustness and that the media configuration selected for use in a multimedia session may change during the multimedia session. Correspondingly, the approaches proposed herein provide mechanisms for dynamically adjusting the service continuity threshold in dependence on which media configuration is currently in use for the multimedia session.

One embodiment involves a method of operation by a network node of a wireless communication network. The method includes receiving robustness information for a plurality of media configurations available for use in a multimedia session involving a wireless communication device, e.g., a "UE" in 3GPP parlance, connected the wireless communication network. Further, the method includes detecting, as a detected media configuration, which media configuration in the plurality of media configurations is in use for the multimedia session, determining, from the robustness information, a fault tolerance of the detected media configuration, and setting a service continuity threshold in dependence on the fault tolerance of the detected media configuration.

Here, the service continuity threshold is used for deciding when to switchover the multimedia session between a packet-switched (PS) transport and a circuit-switched (CS) transport. As an example, the multimedia session may be switched from PS transport in an LTE-based RAN over to CS-transport in a UMTS-based RAN. As a further contextual example, the multimedia session may be a voice call or other streaming media session that is supported by an Internet Protocol Multimedia System (IMS) accessible to the wireless communication device via the wireless communication network. Correspondingly, in an example case, the available media configurations are the available Codecs and Codec configurations, or the available redundancy configurations, and the robustness information indicates the absolute or relative fault tolerance of the available media configurations.

As a non-limiting example of the advantages obtained from the dynamic and intelligent adjustment of the service continuity threshold, the LTE coverage for the multimedia session may be extended in dependence on recognizing that the multimedia session is using a media configuration that is robust, or especially robust in the face of packet loss. "Extending" LTE coverage in this sense should be understood as retaining (or establishing or re-establishing) the LTE connection at lower signal or signal quality levels than would otherwise be permitted, absent tuning the service continuity threshold in dependence on the robustness of the media configuration being used.

In a corresponding embodiment, a network node is configured for operation in a wireless communication network and comprises communication circuitry configured to communicatively couple the network node to one or more other nodes, and processing circuitry operatively associated with the communication circuitry. The processing circuitry is configured to receive robustness information for a plurality of media configurations available for use in a multimedia session involving a wireless communication device connected to the wireless communication network, detect, as a detected media configuration, which media configuration in the plurality of media configurations is in use for the multimedia session, determine, from the robustness information, a fault tolerance of the detected media configuration, and set the service continuity threshold for the multimedia session in dependence on the fault tolerance of the detected media configuration.

Another embodiment involves a method of operation by a network node in an IMS, where the method includes determining a plurality of media configurations available for use for a multimedia session involving a wireless communication device connected to the IMS via a wireless communication network, and indicating the available media configurations to a node in the wireless communication network. Further, the method includes indicating robustness information for the available media configurations. The robustness information enables the wireless communication network to determine fault tolerances of the available media configurations and to set a service continuity threshold in dependence on the fault tolerance of whichever one of the media configurations is in use for the multimedia session. The service continuity threshold is used for deciding when to switchover the multimedia session between a packet-switched transport and a circuit-switched transport. The fault tolerances may be expressed in an absolute sense, or in a relative sense, and there may be defined service level continuity thresholds mapped to the various media configurations that are possible or available, such that the one corresponding to the detected media configuration can be applied.

In a related embodiment, a network node configured for operation in an IMS comprises communication circuitry that is configured for communicating with a node in a wireless communication network. The network node further includes processing circuitry operatively associated with the communication circuitry. The processing circuitry is configured to determine a plurality of media configurations available for use for a multimedia session involving a wireless communication device connected to the IMS via the wireless communication network. Further, the processing circuitry is configured to indicate the available media configurations to the node in the wireless communication network, and further indicate robustness information for the available media configurations, thereby enabling the wireless communication network to determine fault tolerances of the available media configurations and to set a service continuity threshold in dependence on the fault tolerance of whichever one of the media configurations is in use for the multimedia session. The service continuity threshold is used for deciding when to switchover the multimedia session between a packet-switched transport and a circuit-switched transport.

A further embodiment also involves a method of operation by a network node of an IMS and it may be practiced as an addition to, or as an alternative to, the foregoing method. The method of this further embodiment includes determining a plurality of media configurations available for use for a multimedia session involving a wireless communication device connected to the IMS via a wireless communication network, and indicating priorities for one or more of the available media configurations to one or more other nodes involved in negotiating selection of one of the available media configurations for use for the call. The indication of priorities advantageously biases the media configuration selection according to the priorities.

Yet another embodiment involves a method of operation by a network node of a wireless communication network. The method includes receiving information indicating a plurality of media configurations available for use in a multimedia session involving a wireless communication device connected to the wireless communication network via a radio network node. The method further includes determining robustness information corresponding to the available media configurations, the robustness information indicating corresponding fault tolerances of the available media configurations, and sending the robustness information to the radio network node. Sending the robustness information enables the radio network node to set a service continuity threshold in dependence on the fault tolerance of the media configuration it detects as being in use for the multimedia session, where the service continuity threshold is used for switching the multimedia session between a packet-switched transport and a circuit-switched transport.

In a related embodiment, a network node is configured for operation in a wireless communication network and comprises communication circuitry configured for communicating with a radio network node in the wireless communication network. The radio network node connects a wireless communication device to the wireless communication network, and the example network node further includes processing circuitry that is operatively associated with the communication circuitry. The processing circuitry is configured to receive information indicating a plurality of media configurations available for use in a multimedia session involving the wireless communication device, and determine robustness information corresponding to the available media configurations, the robustness information indicating corresponding fault tolerances of the available media configurations. The processing circuitry is further configured to send the robustness information to the radio network node, thereby enabling the radio network node to set a service continuity threshold in dependence on the fault tolerance of the media configuration it detects as being in use for the multimedia session. The service continuity threshold is used for switching the multimedia session between a packet-switched transport and a circuit-switched transport.

Another embodiment involves a method of operation by a wireless communication device that is connected to a wireless communication network supporting a multimedia session involving the wireless communication device. The method includes receiving information from the wireless communication network which indicates whether the wireless communication network sets the service continuity threshold used for the multimedia session in dependence on which media configuration is in use for the multimedia session. The method further includes controlling media configuration changes made or requested by the wireless communication device during the multimedia session, in dependence on the information.

For example, the wireless device may choose to use CA mode rather than reducing bitrate, or it may use or change other redundancy settings in response to knowing that the network will exploit such settings by adjusting the service continuity threshold. The indication that the network may adjust the service continuity threshold in dependence on which media configuration is in use—which may be understood, ultimately, as adjusting in dependence on the robustness of the media configuration in use—may come in the form of one or more priority indications. Such indications inform the wireless communication device about which media configuration(s) are prioritized or preferred by the network.

In a corresponding embodiment, a wireless communication device includes communication circuitry, e.g., a radio transceiver having receiver and transmitter circuitry, for communicating with a wireless communication network, and includes processing circuitry operatively associated with the communication circuitry. The processing circuitry is configured to control media configuration changes made or requested by the wireless communication device for a multimedia session involving the wireless communication device, in dependence on receiving information from the wireless communication network that indicates whether the wireless communication network sets the service continuity threshold in dependence on which media configuration is in use for the multimedia session.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 2 is a block diagram of one embodiment of selected nodes in a wireless communication network and an IMS, along with a wireless communication device of interest.

FIG. 3 is a block diagram illustrating one embodiment of information flow between nodes.

FIG. 4 is a logic flow diagram illustrating one embodiment of processing at a network node in a wireless communication network.

FIG. 5 is a logic flow diagram illustrating one embodiment of processing at a network node in an IMS.

FIG. 6 is a logic flow diagram illustrating another embodiment of processing at a network node in an IMS.

FIG. 7 is a logic flow diagram illustrating another embodiment of processing at a network node in a wireless communication network.

FIG. 8 is a logic flow diagram illustrating an embodiment of processing at a wireless communication device.

FIG. 9 is a block diagram of one embodiment of a wireless communication device.

FIGS. 10-13 are example tables, which may be implemented as mappings or other data structures based on stored information, for relating different media configurations to different robustness or fault tolerance values.

DETAILED DESCRIPTION

Figure 1:
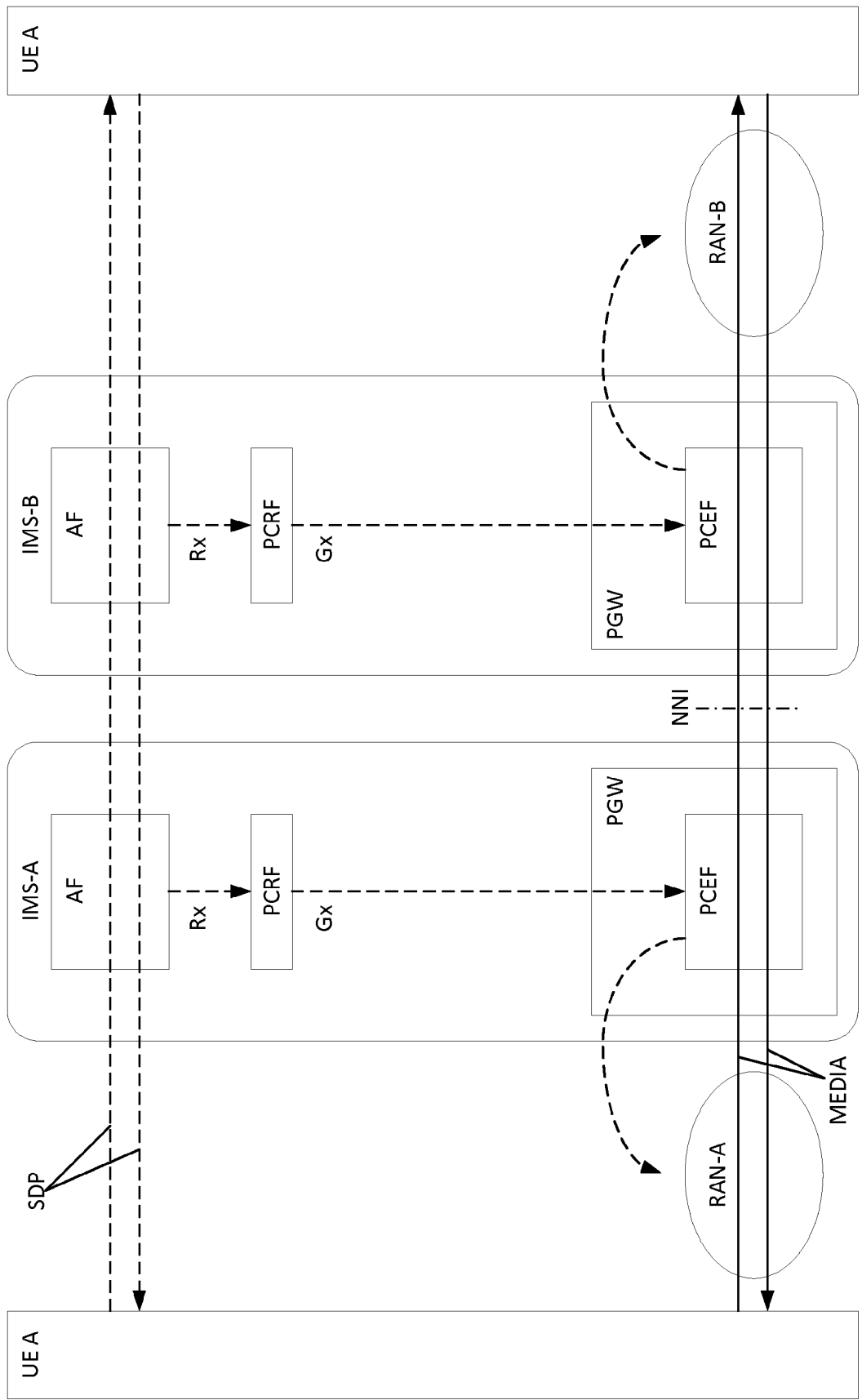
FIG. 1 is a block diagram of a known arrangement of wireless communication networks and corresponding Internet Protocol Multimedia Systems (IMS), for supporting various kinds of multimedia sessions between respective wireless communication devices, or, more generally, between any two communication endpoints.

Current and proposed practices do not recognize the need for, or provide a mechanism for, providing codec configuration details to the RAN. Consequently, while proposed approaches might inform the RAN that an EVS codec was selected for use, the RAN would not know whether the CA mode was being used. Similarly, in the context of AMR and AMR-WB codecs (and non-CA-aware modes of EVS), current and proposed practices would not provide the RAN with key configuration details that are appreciated and exploited herein. For example, the RAN would not know whether or which RTP-based redundancy mechanisms in MTSI were in use for the multimedia session.

A further point appreciated herein is that making the RAN "codec aware" goes against the general principle that RANs should be codec agnostic. That agnosticism has value because the AMR, AMR-WB and EVS codecs may be used for multiple voice services having different service requirements and transport mechanisms. A similar shortcoming is recognized herein regarding the possibility of setting QoS parameters (or QCI values) differently in dependence on which codecs and related configurations are negotiated for the multimedia session in question, as a means of influencing the setting of the service continuity threshold for the multimedia session. For example, adjusting the PELR based on the negotiated codecs and codec configurations leaves unaddressed the fact that the PELR is static for the multimedia session, while codec selection and/or codec configuration may change during the multimedia session. Similarly, the RTP-based redundancy mechanisms provided in MTSI are adaptive and redundancy-related changes in the media configuration being used for the multimedia session would not be reflected in a static PELR.

In a related problem, because existing approaches to setting the SRVCC handover threshold do not involve or enable the kind of dynamic adjustment contemplated herein, such approaches also do not provide mechanisms for informing UEs regarding the use of adaptive thresholds or preferences regarding which codecs, codec configurations, or other such media configuration settings are preferred. For example, in the face of increasing packet loss, a UE according to known practices would not know whether to drop to a lower bitrate EVS-based codec, or switch to the CA-mode EVS codec operating at 13.2 kbps. Making the wrong decision could lead to even higher packet losses or result in "misalignment" with the other "end" of the multimedia session.

In an example of the former issue, if the RAN(s) assume that the UEs in the multimedia session will use the channel-aware mode and, therefore, apply a lower service continuity threshold, then the RANs would continue to use LTE even if the radio signal becomes quite poor at the UEs. In turn, the poor radio conditions mean increased delay (because of re-transmissions) and increased packet loss rate. On the other hand, if the UEs use the channel-aware mode and the RANs are not equipped to adjust the service continuity threshold in view of that, the extra robustness provided by the channel-aware mode is wasted in some sense.

Consider a first RAN supporting a first UE involved in a multimedia session with a second UE supported by a second RAN. If one of the RANs is configured according to the teachings herein, it may, for example, adopt a lower service continuity threshold for the UE it supports, in response to detecting use of the EVS channel-aware mode. On the other hand, if the other RAN is not configured to adapt the service continuity threshold for the UE it supports, the two endpoints can become misaligned in their operation.

In short, there is currently no known solution to adapt the service continuity threshold used for controlling switchover between the use of PS-transport and CS-transport for a multimedia session, in dependence on changing media configurations in use for the multimedia session. Correspondingly, there is currently no known mechanism for providing the involved UEs or other such communication apparatus with information about whether such adaptability is used by the involved RAN(s), or which media configurations are preferred by the RAN(s). Among other things, the methods and apparatus detailed herein address such problems.

FIG. 2 illustrates a wireless communication device (WCD) 10 that connects to an Internet Protocol Multimedia System (IMS) 12 through a wireless communication network 14, for communicating with another wireless communication device 16 that is accessible through one or more further networks 18. The further networks 18 include, for example, a further IMS and wireless communication network associated with the WCD 16. Of course, the methods and apparatuses herein apply whether the WCDs 10 and 16 are in the same wireless communication network and/or are supported by the same IMS.

The network depictions omit complicating details in favor of focusing on an example arrangement of network nodes 20, 22, and 24 that are involved in supporting a multimedia session between the WCD 10 and the WCD 16. The multimedia session ("session") may be, for example, a voice call or other streaming or real-time multimedia session, but the types of sessions contemplated herein are not limited to those examples. Establishing or maintaining the session may also involve other nodes 26, which are not individually illustrated or described.

The respective network nodes 20, 22, and 24 are associated with certain functions or operations herein, and those functions can be distributed between or among more than one node, whether the involved nodes are co-located or remote from one another. Therefore, the term "network node" as used herein does not exclude the possibility of more than one node. In a particularly advantageous example, one or more of the functions attributed to any one or more of the network nodes 20, 22, and 24 may be performed by cloud-based processing nodes, e.g., computer servers that provide one or more pools of processing resources for carrying out at least some of the operations described herein.

According to those operations, one or both network nodes 20 and 22 are configured to provide robustness information and/or priority information to the network node 24, for the media configurations that are available for use in a session involving the WCD 10. In turn, the network node 24 detects the media configuration in use for the session and adjusts the service continuity threshold used for the session in dependence on the detected media configuration and its associated robustness. In the example arrangement of FIG. 3, the network node 20 is operative as a Proxy Call Session Control Function (P-CSCF) in the IMS 12, the network node 22 is operative as a Policy and Charging Rules Function (PCRF) in the network 14, and the network node 24 is operative as a radio base station, e.g., as an eNB, in a Radio Access Network (RAN) portion of the network 14.

It will be appreciated that these respective nodes 20, 22, and 24, each comprise various types or forms of communication circuitry that is configured for communicating in accordance with the respective node contexts and functions. Further, the respective nodes 20, 22, and 24 include corresponding processing circuitry that is configured for carrying out the operations described herein for the respective nodes.

Such processing circuitry comprises fixed or programmed circuitry and, in at least one embodiment, includes one or more microprocessors, Digital Signal Processors (DSPs), Application Specific Integrated Circuits (ASICs), Field Programmable Gate Arrays (FPGAs), or other digital processing circuits. For example, each node 20, 22, and 24 in some embodiments includes one or more processing circuits that are configured according to the execution of computer program instructions stored in storage included in or associated with the processing circuits. Such storage comprises, for example, hard disks, solid state disks, FLASH, EEPROM, and may also comprise volatile memory for working data and program execution.

Such details apply to each of the nodes 20, 22, and 24, although the respective nodes 20, 22, and 24 do not necessarily use the same processing architectures or detailed circuit arrangements. With such points in mind, the network node 24 includes communication circuitry 30, processing circuitry 32, and storage 34, which may store one or more computer programs 36 and supporting configuration data 38. The network node 22 includes communication circuitry 40, processing circuitry 42, and storage 44, which may store one or more computer programs 46 and supporting configuration data 48. The network node 20 includes communication circuitry 50, processing circuitry 52, and storage 54, which may store one or more computer programs 56 and supporting configuration data 58.

As a non-limiting example of the nodal differences regarding such circuitry, in embodiments where the network node 24 comprises or includes a radio base station, the communication circuitry 30 includes RF circuitry—receivers and transmitters—configured to support the air interface used for providing the radio link with the WCD 10, and further includes computer or data network interfaces—e.g., physical-layer wired or wireless circuitry and associated protocol processors—for communicating with other radio nodes and supporting nodes in a Core Network (CN) portion of the network 14. Such communication circuitry 30 supports, for example, direct or indirect communications with the network node 22 and/or 20.

Along similar lines, the communication circuitry 50 in the network node 20 includes communication circuits configured for communicating directly or indirectly with the network node 22 and/or network node 24, and any number of other network nodes in the IMS 12 or network 14 which are not illustrated. Further, the communication circuitry 40 in the network node 22 includes communication circuits configured for communicating directly or indirectly with the network node 20 and/or 24, and any number of other network nodes in the IMS 12 or network 14 which are not illustrated.

As explained earlier herein, the service continuity threshold may be expressed as a signal quality or signal level used to control switchover of the session between Packet-Switched (PS) transport and Circuit-Switched (CS) transport. References to the "service continuity threshold" shall be understood as referring to one or more thresholds. As one example, a pair of thresholds may provide for hysteresis when deciding whether to return to PS transport subsequent to switching from PS transport to CS transport. Further, as explained, the "media configuration" is a construct or definition that includes or depends on one or more parameters or settings that influence whether or to what extent the session is vulnerable to faults, such as the packet losses that occur over wireless links. Thus, different media configurations may be defined in terms of differences in coding rates, redundancy levels, etc., that are available for packetizing the underlying media.

FIG. 4 illustrates an example method 400 of operation by the network node 24, including receiving (Step 402) robustness information for a plurality of media configurations available for use in a session involving a WCD 10 connected to the network 14, detecting (Step 404), as a detected media configuration, which media configuration in the plurality of media configurations is in use for the session, determining (Step 406), from the robustness information, a fault tolerance of the detected media configuration, and setting (Step 408) a service continuity threshold in dependence on the fault tolerance of the detected media configuration, the service continuity threshold used for switching the session between a packet-switched transport and a circuit-switched transport.

The fault tolerance of each media configuration in the plurality of media configurations expresses, for example, a packet loss tolerance of the media configuration. Further, the detecting step 404 comprises, in one or more embodiments, an ongoing operation, and wherein the steps of determining 406 and setting 408 are repeated in response to the detected media configuration changing.

In other example details, receiving the robustness information in Step 402 comprises receiving the robustness information from an IMS 12 that is supporting the session, or from another network node 22 operating as a PCRF for the network 14. However received, receiving the robustness information in some embodiments comprises receiving an indicated level of fault tolerance of each media configuration in the plurality of configuration, such that determining (Step 406) the fault tolerance of the detected media configuration comprises reading the indicated level of fault tolerance from the robustness information. Correspondingly, the Step 408 of setting the service continuity threshold in dependence on the fault tolerance of the detected media configuration comprises setting the service continuity threshold to a value that maps to the indicated level of fault tolerance, according to mapping information known to the network node 24 from predefined configuration information 38 or from received signaling.

In a particular example, receiving (Step 402) the robustness information comprises receiving fault tolerance indicators corresponding to the plurality of media configurations, where the fault tolerance indicators indicate corresponding levels of fault tolerance for the plurality of media configurations. In an example embodiment or instance, each media configuration comprises a Coder-Decoder (CODEC) configuration, and wherein detecting (Step 404) which media configuration is in use for the session comprises detecting which CODEC configuration is in use for the session based on determining a Real-time Transport Protocol (RTP) payload type of packets flowing in the session, and mapping the RTP payload type to a corresponding CODEC configuration, according to mapping information that associates different RTP payload types with different CODEC configurations.

In another embodiment or instance, where each media configuration comprises a Coder-Decoder (CODEC) configuration, detecting (Step 404) which media configuration is in use for the session comprises detecting which CODEC configuration is in use for the session based on determining a Frame Type (FT) identifier from payloads of Real-time Transport Protocol (RTP) packets flowing in the session, and mapping the FT identifier to a corresponding CODEC configuration, according to mapping information that associates different FT identifiers with different CODEC configurations.

Additional, or alternatively, where each media configuration comprises a Coder-Decoder (CODEC) configuration, detecting (Step 404) which media configuration is in use for the session comprises detecting which CODEC configuration is in use for the session based on detecting a size of packets flowing in the session, and mapping the size to a corresponding CODEC configuration, according to mapping information that associates different sizes with different CODEC configurations. In another example, each media configuration comprises a redundancy configuration, and detecting (Step 404) which media configuration is in use for the session comprises detecting which redundancy configuration is being used for packets flowing in the session.

In any of the above embodiments or instances, receiving (Step 402) the robustness information for the plurality of media configurations available for use in the session comprises, for example, receiving policy information that maps different media configurations to different settings of the service continuity threshold, wherein the policy information maps media configurations to service-continuity threshold settings, or to different values of fault tolerance, which in turn map to service-continuity settings. The plurality of media configurations comprises, for example, a first media configuration that is not fault tolerant and a second media configuration that is fault tolerant, and the method 400 includes setting the service continuity threshold to a first level responsive to detecting that the first media configuration is in use, and setting the service continuity threshold to a second level responsive to detecting that the second media configuration is in use. The second level allows for a lower received signal quality at the WCD 10 as compared to the first level.

Referring to FIG. 2 momentarily, the network node 24 in one or more embodiments comprises communication circuitry 30 that is configured to communicatively couple the network node 24 to one or more other nodes 20 and 22, and processing circuitry 32 operatively associated with the communication circuitry 30. The processing circuitry 32 is configured to receive robustness information for a plurality of media configurations available for use in a session involving a WCD 10 connected to the network 14, detect, as a detected media configuration, which media configuration in the plurality of media configurations is in use for the session, determine, from the robustness information, a fault tolerance of the detected media configuration, and set the service continuity threshold used for the session in dependence on the fault tolerance of the detected media configuration.

FIG. 5 depicts a method 500 of operation implemented by the network node 20 operating in the IMS 12. The method 500 includes determining (Step 502) a plurality of media configurations available for use for a session involving a WCD 10 connected to the IMS 12 via the network 14, and indicating (Step 504) the available media configurations to a node 22 and/or 24 in the network 14. The node 20 further indicates robustness information for the available media configurations. The robustness information enabling the network 14 to determine fault tolerances of the available media configurations and to set the service continuity threshold used for the session, in dependence on the fault tolerance of whichever one of the media configurations is in use for the session.

FIG. 6 depicts a method 600 implemented by the network node 20, as an alternative to the method 500, or as an addition to or extension of the method 500. The method 600 includes determining (Step 602) a plurality of media configurations available for use for a session involving a WCD 10 connected to the IMS 12 via the network 14, and indicating (604) priorities for one or more of the available media configurations to one or more other nodes (26) involved in negotiating selection of one of the available media configurations for use for the session, to thereby bias media configuration selection according to the priorities. It will be appreciated that the processing circuitry 52 of the network node 20 may be configured to perform the method 500 and/or 600.

FIG. 7 depicts a method 700 of operation by the network node 22 and it includes receiving (Step 702) information indicating a plurality of media configurations available for use in a session involving a WCD 10 connected to the network 14, and determining (Step 704) robustness information corresponding to the available media configurations, where the robustness information indicating corresponding fault tolerances of the available media configurations. The method 700 further includes sending (Step 706) the robustness information to another node (e.g., node 24) in the network 14, to enable the other node to set the service continuity threshold used for the session, in dependence on the fault tolerance of the media configuration it detects as being in use for the session.

FIG. 8 depicts a method 800 of operation by the WCD 10, where the method 800 includes receiving (Step 802) information from the network 14, which network supports a session involving the WCD 10. The information indicates whether the network 14 sets a service continuity threshold in dependence on which media configuration is in use for the session. Here, the media configuration in use is selected from a plurality of media configurations available for use for the session, and the method 800 includes the WCD 10 controlling (Step 804) media configuration changes made or requested by the WCD 10 during the session, in dependence on the information.

For example, controlling media configuration changes made or requested by the WCD 10 during the session, in dependence on the information, comprises determining whether to select a lower bitrate Enhanced Voice Service (EVS) Coder-Decoder (CODEC) or a channel-aware EVS CODEC, in dependence on whether the information indicates that the wireless communication network (14) prioritizes the channel-aware EVS CODEC. More generally, the WCD 10 may bias its use (or its requests for use) towards media configurations that are prioritized.

FIG. 9 depicts an example arrangement for the WCD 10, for carrying the method 800, or variations and extensions thereof. The WCD 10 includes communication circuitry 60 and operatively associated processing circuitry 62, along with storage 64 storing, for example, one or more computer programs 66 and supporting configuration data 68. Here, the configuration data 68 comprises, for example, media configuration robustness or priority information received from the network 14.

The communication circuitry 60 comprises, for example, a RF transceiver configured for communicating with the network 14, and the processing circuitry 62 comprises one or more digital processing circuits, e.g., microprocessors, DSPs, FGPAs, ASICs, etc. In at least one embodiment, the processing circuitry 62 and storage 64 comprise a processing circuit and memory, wherein the processing circuit is configured according to the device-side teachings herein based at least in part on its execution of computer program instructions stored in the memory.

According to further details, consider that an IMS, and more notably the involved P-CSCF within the IMS, will set up the value of the fault tolerance level depending on the SDP being negotiated in conjunction with a table being configured by the operator for that purpose. The level of fault tolerance may be referred to as a QoS Fault Tolerance or QFT. Other parameters, negotiated in SDP, can also be input in the configuration table.

The eNB will map the received value to a specific service continuity threshold according to a table set up by the operator in the eNB for that purpose.

As an example, the QFT can take a value from 1 to 5, with 1 being average fault tolerance and 5 being extremely fault tolerant.

As an example, to illustrate this, assume that the operator wants to influence the service continuity threshold depending on the codec being used. It can then set up such a table in the P-CSCF, such as depicted in the table of FIG. 10. There can be as many table entries as desired by the operator. The priority is used by the P-CSCF for selecting the appropriate entry when more than one codec is included in an SDP offer, and considering whether transcoding can be performed between codecs included in a SDP Offer.

The RTP payload type number is assigned in the SDP offer/answer negotiation. In one embodiment contemplated herein, each RTP payload type number identifies one media configuration. The tag and the QFT values are communicated to the eNB, and it will be appreciated that the example tags are in a simple form. Another very simple form of tag would be to use the packet size as the tag. Such a tag, however, requires that different media configurations have different packet sizes, and that is often not true. More advanced forms of tags may be used, and further tag definitions are described below.

The corresponding table in the eNB node in an example implementation looks like the one depicted in FIG. 11 and can be understood as defining a mapping between defined QFT values and corresponding service continuity threshold parameters. The eNB associates each QFT value to respective RAN-specific parameters, e.g., specific values of the service continuity threshold. In operation, the eNB or other involved node reads the RTP packet header, extracts the RTP payload type number (which equals the tag) and from the tag knows which service continuity threshold to apply. For example, if the RTP payload type found in the RTP packet is 96 or 97, then the eNB applies threshold 1 (RAN specific parameter 1), and if the RTP payload type found in the RTP packet is 98, then the eNB applies threshold 5 (RAN specific parameter 5). As further seen in the table, it is possible to map several tags to the same threshold. It can also happen that the eNB is configured with thresholds that are not used by a particular session (although they may be used in another session).

The table depicted in FIG. 12 illustrates how RTP PT number and packet size may be combined to form or define tags. As can be seen, the RTP PT number will be the same (98) for RTP packets containing the EVS 13.2 with channel-aware mode and RTP packets containing any of the other EVS bit rates. Therefore, the RTP PT number is not sufficient to correctly identify that the EVS 13.2 CA mode is currently being used. One contemplated approach to addressing that issue is to combine the RTP PT numbers with other information, such that the tag types can be used for indicating the media configuration in use, including CA mode for EVS. In this case, the RTP packet size is used, but one could also use the UDP packet size or the IP packet size.

With this approach, the eNB would check the RTP PT number and the RTP packet size when detecting the media configuration in use and making any corresponding adjustments to the service continuity threshold. Such tags are also simple to use for the eNB because both the RTP payload type number and the packet size can be easily determined without inspecting the content of the packet any further.

Another example is to assign different QFT values for different bitrates, even for the same codec. See, for example, the table depicted in FIG. 12. The P-CSCF may use the priority to order the preference list on the m=line in the SDP offer to reflect this priority. This will then influence the SDP offer/answer negotiation such that the EVS 13.2 kbps channel-aware configuration is the most likely configuration to be selected for the session.

After the SDP offer/answer negotiation, the P-CSCF sends the QFT value for the selected configuration to the PCRF, which assigns the appropriate QCI and QoS parameters.

FIG. 13 illustrates another contemplated embodiment, which assigns different QFT values for different bitrates within the same codec configuration. Here, the Frame Type index is used to distinguish between different media configurations. However, the location of the Frame Type index within the RTP payloads is typically different for different payload formats (i.e. for different codecs). The eNB therefore needs to know that the EVS payload format was used. Therefore, the tags in this example are combinations of the codec and the Frame Type index. One may understand this tag structure as being a more advanced approach, because the eNB would need to read the contents of the RTP packets flowing in the session, to extract the necessary information to detect the media configuration in use and correspondingly apply the correct service continuity threshold.

Assume, for example, that the negotiated codec configuration is EVS 5.9-13.2 kbps. In this case, the P-CSCF sends a list of QFT values (and possibly also the corresponding priorities) to the PCRF. See the table in FIG. 13 for an example of information stored in a P-CSCF defining QFT and priority for different codecs and codec configurations. This means that a "bitrate vs. fault tolerance profile", or QFT profile, is defined. The QFT profile is then forwarded to the RAN, which then applies a different service continuity threshold depending on which bitrate is currently used.

An extension to this solution is to send the QFT value (or the QFT profile) to the WCD (also referred to as a UE) to influence how the UE will behave when adaptation is needed, for example in the following way:

If the UE receives a QFT value or QFT profile indicating that EVS 13.2 channel-aware mode has priority 1, and the other EVS bitrates have a lower priority, then this indicates that RAN prefers to use the EVS 13.2 channel-aware mode over adapting to lower bitrates, because RAN will then use a different SRVCC threshold for the 13.2 kbps bitrate.

However, if the UE receives a QFT value or QFT profile indicating the same priority (or lower) for the EVS 13.2 channel-aware mode than for the other bitrates, then this indicates that RAN will not use a different SRVCC threshold for the 13.2 kbps bitrate. Therefore, if the UE decides to adapt the bitrate then it will switch to lower bitrates instead of using the channel-aware mode.

Correspondingly, the QFT value or the QFT profile can also be sent to media gateways, which can then be used to control how the adaptation in the MGWs works.

The QFT information would typically be sent from the eNB to the UE although other possibilities may also exist.

Another extension to this solution is to negotiate the QFT value or the QFT profile in the session setup (e.g. in the SDP offer/answer negotiation), between the UEs (or between a UE and an MGW). Thereby, it is possible to align the QFT information end-to-end. This is beneficial because the bitrate and redundancy adaptation normally works end-to-end. I.e., if the local UE needs to receive media with a lower bitrate or with more redundancy, then the local UE will send an adaptation request that goes to the remote UE, and the remote UE then switches to the requested bitrate and/or redundancy level. Thereby, it is possible to avoid cases where the local UE wants to receive 13.2 kbps with channel-aware mode, but the remote UE anyway decides to adapt to a lower bitrate where channel-aware is not available. Note, too, that the involved nodes/systems can negotiate QFT values or profiles for each media configuration that is allowed in the session.

Of course, it should be appreciated that other forms of tags or packet marking schemes are contemplated herein, and that there is a variety of mechanisms that can be used for detecting or indicating the media configuration in use for a communication session. For example, in another embodiment contemplated herein, a media policy or policies define the relationship between media configurations and corresponding service continuity thresholds, and the UE is configured to receive corresponding policy information, e.g., at session setup, and then provide a policy indication to the eNB whenever it changes its media configuration, e.g., whenever it changes codecs. Such operation enables the eNB to recognize the configuration change and apply the corresponding service continuity threshold.

In at least one such embodiment, the P-CSCF and/or PCRF need not provide robustness or fault tolerance information to the eNB as part of session setup. Instead, the UE sends indications that directly or indirectly indicate to the eNB/RAN as to which service continuity threshold to apply to the multimedia session. For example, the UE could send a policy indication corresponding to the media configuration in use for the session and the eNB/RAN would use policy information—mapping information—to map the policy indicators incoming from the UE to corresponding service continuity thresholds.

In operation according to an example embodiment, the UE embeds information in one or more RTP packets outgoing from it for the session in question, where such information indicates the policy applicable to the media configuration currently in use for the session. The UE would, of course, update the embedded information to indicate any changed policies associated with any changes in the media configuration that occur during the session. Correspondingly, rather than detecting the media configuration in use for the session, the eNB—or any other node(s) configured to make the service continuity threshold adaptations for the session—recognizes the embedded policy indicators and uses the corresponding policies known to it, for deciding whether or how to adapt the service continuity threshold applied for the UE, for the session.

The above example arrangements and operations enable all operators and/or networks in a session path to influence the media configuration negotiation as well as the corresponding service continuity threshold adaptation(s), such that operations are aligned end-to-end, which avoids ending up in conflicting configurations or conflicting codec usage.

The mapping between QFT values and service continuity threshold adaptation behavior may be available in the relevant specification(s) (e.g. in 3GPP TS 26.114), to ensure that different UE (and MGW) implementations have the same understanding of how QFT information is used for adapting service continuity thresholds.

An alternative to sending the QFT value/profile as QoS information to the RAN and to the UE is to define the values/profiles in a specification (or some other document, e.g. an SLA between operators) and then to send just a "QFT identity" to the RAN and/or to the UE. This allows for defining QFT values and priorities for many media configurations, which could result in a very large table, while still reducing the signaling overhead needed to send this information between network nodes, in particular if the QFT information would be sent to the UE. To map the QFT identity to a QFT value/profile, network nodes (or UEs) would need to either be configured with the mapping or they need to be able to fetch the mapping from e.g. a database.

FIGS. 10-13 illustrate example mappings between certain media configurations and their corresponding QFT and priority values. In reality, the eNB is codec agnostic and does not know which exact codec is used. There are several alternatives to having a direct mapping between the codec and the QFT and priority information.

When RTP is used for the media transport and when SDP is used for the session setup then the session setup negotiation determines a mapping between an RTP payload type number and a codec configuration. It is possible to negotiate using multiple RTP payload type numbers for a session. The RTP payload type number can then be used for representing the detailed codec configuration in the codec<=>QFT-priority mapping. Since every RTP packet contains the RTP payload type number (inserted by the entity that creates the RTP packet, usually the UE), this provides a simple way for the eNB to understand which codec configuration was used when creating the packet. The eNB reads the RTP header to fetch the RTP payload type number can then apply the corresponding QFT and priority.

For codecs, like AMR, AMR-WB and EVS, that can encode the audio using many different bitrates, it may not be sufficient to use only the RTP payload type number. This is because the codec supports different bitrates, but all typically use the same RTP payload type number. In such cases, the RTP payload often includes a Frame Type (FT) identifier, which identifies the exact bitrate that was used for the encoding. This is included since the decoder will need to know which exact codec rate to use for decoding. For example, when the AMR 4.75 kbps rate is used then FT is set to '0' but when AMR 12.2 kbps is used then FT is set to '7'. In such cases, the FT identifier can be used (possibly in combination with the RTP payload type number) by the eNB to determine which codec configuration was used and then the eNB can use the corresponding QFT and priority.

Another alternative is to define a mapping between the used bitrate and the QFT and priority. Thereby, the eNB can calculate the currently used bitrate and apply the corresponding QFT and priority.

Yet another alternative is to define a mapping between packet sizes (or RTP payload sizes) and the QFT-priority information. The eNB can then use the packet size (or the RTP payload size) information to apply the corresponding QFT and priority.

Other alternatives also exist, for example to use a packet marking scheme. Several packet marking schemes are already available, so these variants are not further described here.

Any method that offers means for explicit or implicit identification of individual packets or of a multitude of packets can be used for determining which QFT and priority values should be applied.

When implicit means are used for determining the media configuration in use then there is a risk that the determination is not 100% accurate. It can therefore be useful to combine several methods to increase the accuracy, for example to use bitrate and packet size. It should be obvious that many other combinations are possible.

It is also possible to use a combination of explicit and implicit means. For example, if EVS is negotiated with multiple bitrates, e.g. 7.2-16.4 kbps, then the same RTP payload type number will typically be used for all RTP packets. However, it is then possible to use the packet size to determine which packet includes speech encoded with the EVS 13.2 kbps channel-aware mode because these packets will have a different size than those RTP packets containing speech encoded with another bitrate.

Figure 14:
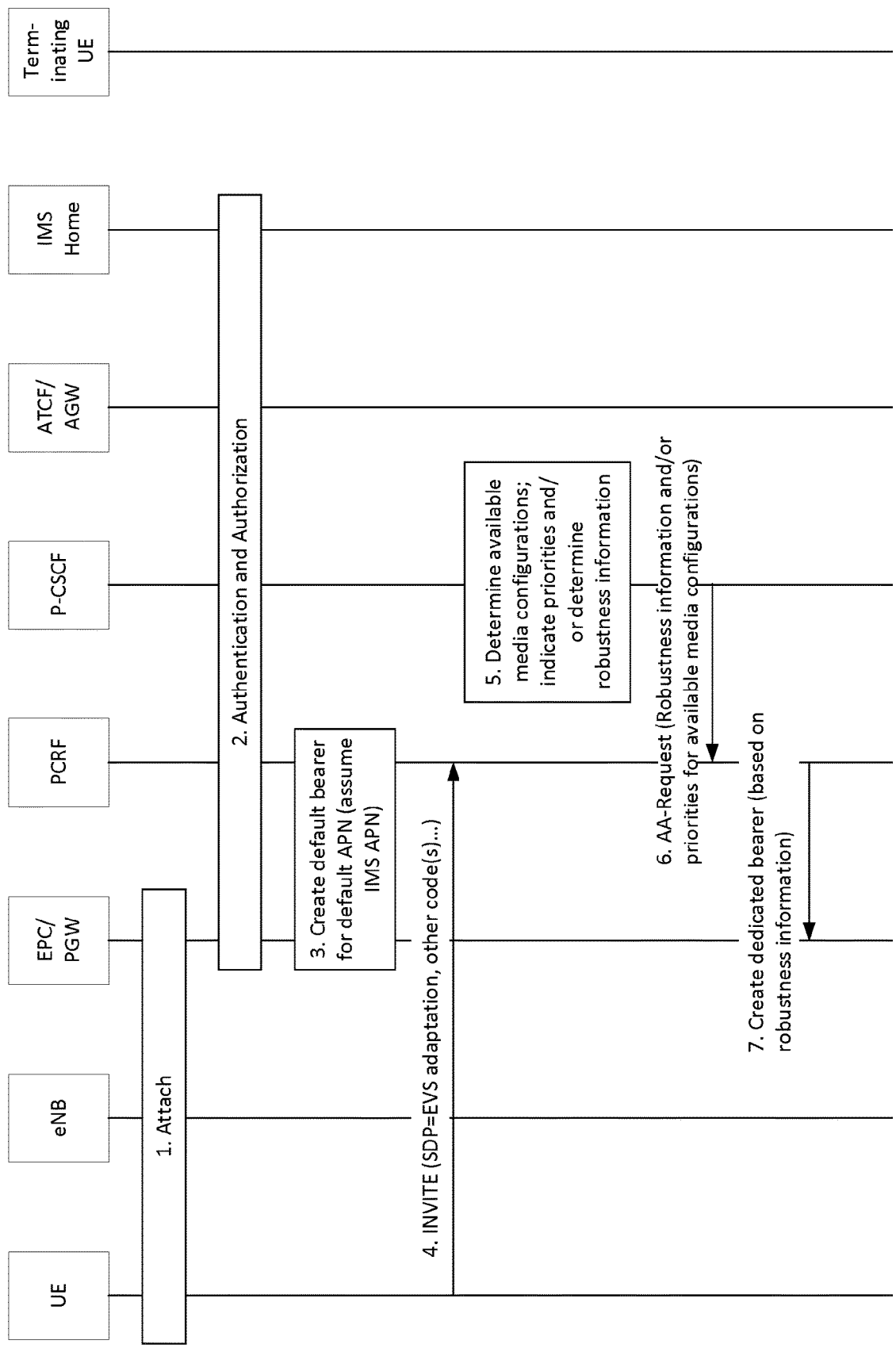
FIGS. 14-16 are sequence diagrams for one or more embodiments of adjusting a service continuity threshold in dependence on the media configuration in use for a multimedia session involving a wireless communication device that is connected to an IMS via a wireless communication network.
Figure 15:
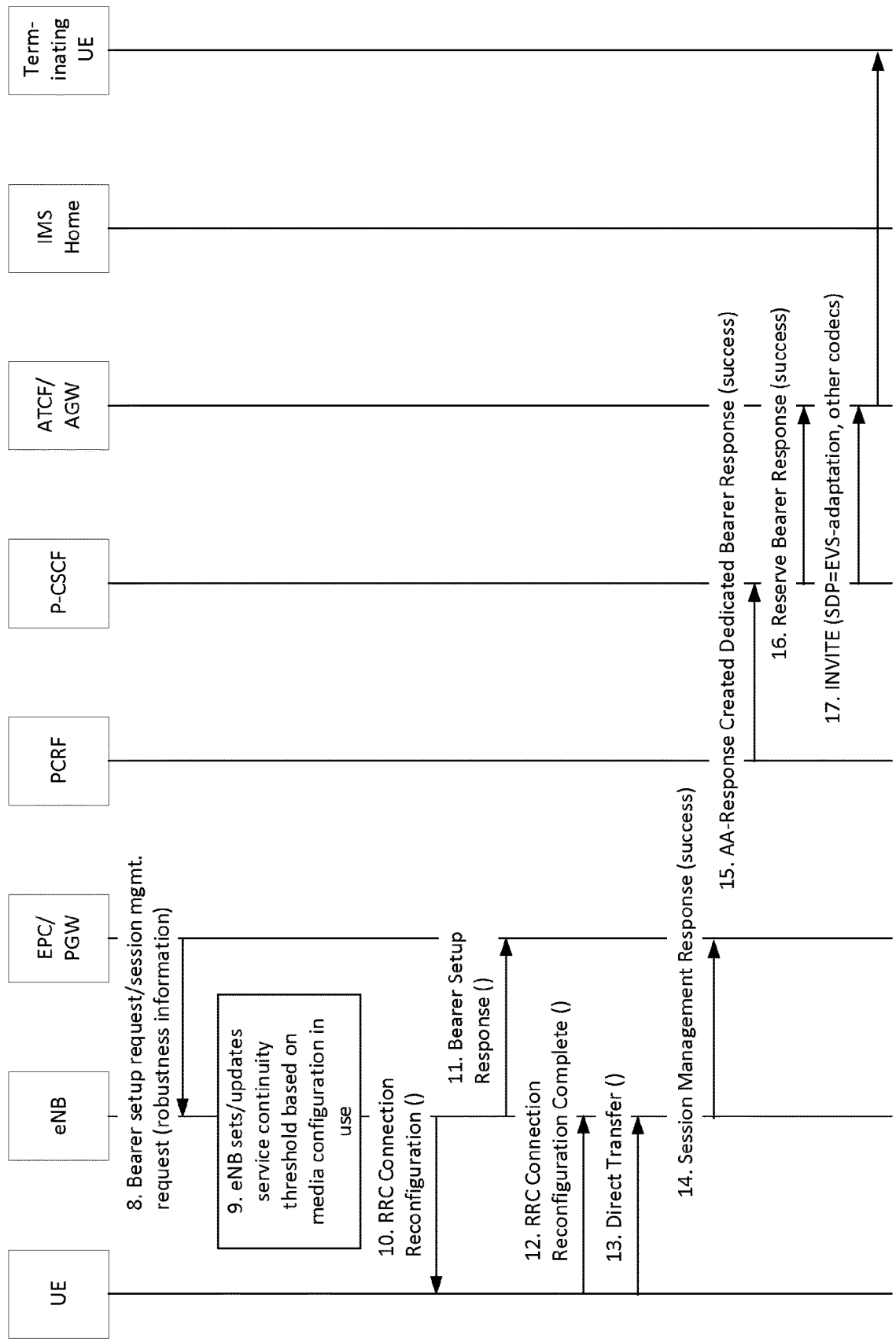
Figure 16:
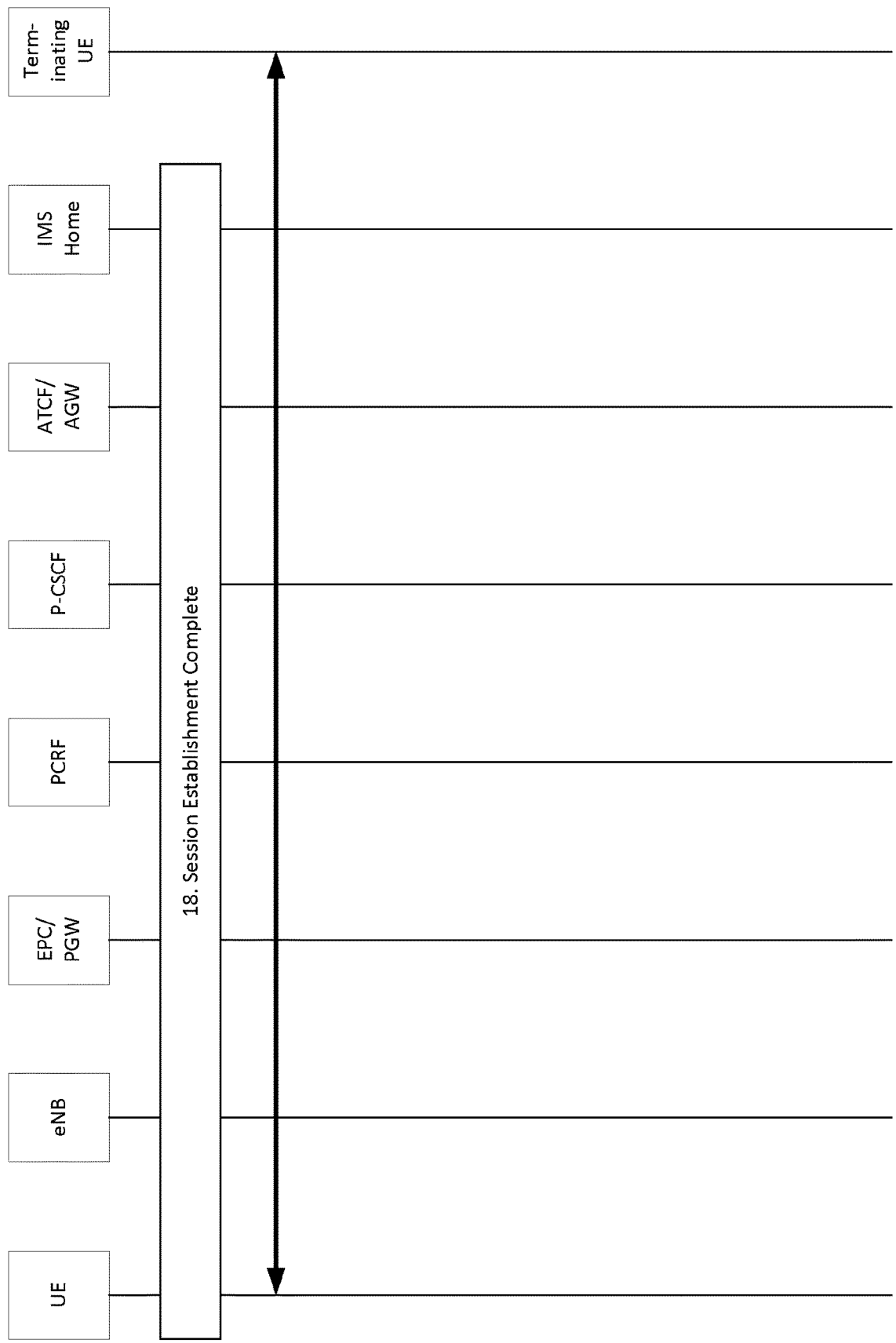

FIGS. 14-16 illustrate call flow details contemplated inter-node operations and communications, and particularly illustrating how QFTs or related information is sent for use in the RAN in setting the service continuity threshold. These figures only cover basic operations and do not treat extensions where the information is sent to the UE(s) or to Media GateWay(s).

Regarding FIG. 14, Steps 1 to 3 are per existing specifications, where a UE attaches to an Evolved Packet Core (EPC) and is authenticated, and where a default bearer is established for the default Access Point Name (APN) which is either configured in the user profile or included by the UE at attachment. In this case the IMS APN is the default APN.

In step 4, the UE initiates an IMS session and is assumed here to include an EVS 13.2 kbps channel-aware mode, and an AMR codec.

In step 5, the P-CSCF realizes that it can perform transcoding if the terminating UE accepts AMR. It then consults the table, and it realizes in this case that EVS 13.2 kbps channel-aware mode is higher priority and as such it sets the QFT for that entry.

In step 6 the P-CSCF sends an AA-Request to the PCRF and includes the new QFT parameter. The PCRF itself makes no use of that parameter, it just passes it transparently in the massages to the PGW, used for creating the dedicated bearer, which is depicted as step 7 and done per existing procedures.

FIG. 15 continues the call flow, regarding QFT and IMS session setup. In step 8, the PGW forwards the Bearer Setup Request as per existing procedures with the exception of the new parameter(s) all the way to the eNB. The details are not shown here for brevity. In step 9 the eNB consults its table and, based on the included QFT, sets the new parameter for the SRVCC threshold. Steps 10 to 14 conform to existing procedures per the existing standards defined in 3GPP TS 23.401 v14.1.0 and will not be further explained. At step 17, having selected, based on its table the EVS codec, the P-CSCF proxies the INVITE towards the destination, i.e., the terminating UE.

FIG. 16 continues the call flow, where session setup is completed as per existing specifications.

The call flow(s) described above show that the QFT information is sent to an eNB, or another node operating as a decision maker for the RAN, at call setup. However, it is possible to store this information in the eNB such that it can be re-used for later similar sessions. The mapping between QFTs and service continuity handover thresholds can also be stored for later re-use.

The methods and apparatus disclosed herein thus provide for the advantageous influencing of the service continuity threshold setting used for a given media session on a dynamic basis, in dependence on the robustness of the media configuration in use for the session. Further, such operations are enabled through the advantageous use of mapping information, which can be signaled efficiently between the involved nodes, and without revealing certain settings or characteristics which may be sensitive from the network operator's perspective.

Additionally, the teachings herein provide a mechanism for aligning the bitrate and redundancy adaptation (in UEs or MGWs) with the RAN configuration, and vice versa, such that conflicting codec usage and RAN configuration can be avoided. Similarly, the methods and apparatuses detailed by way of example herein provide a mechanism for aligning bitrate and redundancy adaptation end-to-end, e.g. between two UEs in different operator networks, such that conflicting usage and configuration can be avoided.

In at least one embodiment, media policies or other policies are used in the RAN to map the incoming media to a specific fault tolerance value or level, which then maps to a defined or derived service continuity threshold setting. Alternatively, the RAN may map detected media configurations directly to service continuity threshold settings, which are based on the corresponding robustness of those configurations. Here, the "incoming media" shall be understood as the media flowing in the session.

In an example case, a supporting P-CSCF provides the information to the RAN. Alternatively, a PCRF in the associated CN provides the policy information to the RAN. Also, the phrase "provided to the RAN" shall be understood as encompassing providing information to any entity that makes the RAN-related decision of which service continuity threshold to apply to a session. The decision-maker may reside within the RAN, e.g., such as an eNB or other radio base station, or may reside elsewhere, such as in a cloud-based server. The policy has general applicability, or it may be specified in dependence on the particular media configurations available for the session, the involved wireless communication device (or associated owner/subscriber), etc. In any case, the policy may be embodied, for example, as an eXtensible Markup Language (XML) document or other data container that includes values for the involved policy parameters or settings.

In a detailed example, wireless communication devices operating as communication endpoints for a session between them exchange or negotiate robustness-related information for the media configurations that are negotiated as being available for use in the session. A P-CSCF or PCRF involved in supporting the session extracts from the Session Description Protocol (SDP) messaging the robustness information for the negotiated media configurations and translates such information into fault tolerance information that is then sent or forwarded for use in a supporting RAN, for adjusting the service continuity threshold. The fault tolerance information may also be sent to at least one of the wireless communication devices.

The above passage distinguishes between "robustness information" and "fault tolerance" although in other instances, the terms may be synonymous, e.g., the robustness of a given media configuration is expressed in terms of its fault tolerance, which may be a numeric or other value reflecting its level of fault tolerance. As an example, a simple approach involves defining, say, four levels of fault tolerance and then assigning each media configuration one of those defined levels in dependence on whether it is more or less tolerant of faults. The levels may range from least (or not) fault tolerant to most fault tolerant. Or a continuum or finer gradations may be used.

However, there are advantages to maintaining separate robustness and corresponding fault tolerance information. For example, fault tolerance may depend on operator policies, or network planning, or other conditions that an operator does not want to disclose to other operators. One solution involves defining robustness levels in dependence on the characteristics of the media configurations at issue, and then allowing operators to maintain their own mappings between those robustness levels and fault tolerance. In that manner, different operators may use the same robustness information and yet use different fault tolerance settings. More broadly, the approach enables different network operators to make different mappings between media configuration robustness and service continuity threshold settings.

As one example, Operator A may have a very good CS network but may have limited LTE coverage. If so, the operator might prefer to switchover a session from PS transport to CS transport "early", to maintain good quality, e.g., to maintain a low frame erasure rate in a voice call. On the other hand, Operator B maybe has a good LTE network and a fairly poor CS network, and may want to keep sessions on PS transport in the LTE network as much as possible. If so, Operator B would use a lower, less aggressive service continuity threshold for switching sessions over from PS transport in the LTE to CS transport in the CS network. The way the communication endpoints exchange information via SDP messaging can be configured to avoid revealing any robustness-related information that a network operator might consider as proprietary.

The P-CSCF and/or PCRF (denoted as P-CSCF/PCRF) supporting a given session should be able to know which properties will be used in the session. This would be based on what is included in the SDP messaging for the session and knowledge about the different media configurations that are available for the session, e.g., expressed in terms of Codec options and packetization options. The P-CSCF/PCRF must also know which robustness level or value applies to each available media configuration. Here, it may be noted that the universe of possible media configurations may exceed the universe of defined robustness or fault-tolerance levels, i.e., more than one media configuration may map to the same robustness or fault-tolerance level.

In any case, based on the above-described knowledge, the P-CSCF/PCRF describes the connection between such properties and the corresponding fault tolerance level or value, and provides such information for application in the RAN. For example, it provides such information directly to a radio base station in the RAN, or it provides the information to a node that is responsible for controlling the service continuity threshold applied in the base station. The description may be made in several ways. For example, in a simple case, the involved session has two available media configurations— e.g., two codec configurations or two RTP Payload Type numbers—that need or warrant different service continuity threshold settings.

In such a case, example fault tolerance information is as follows: if RTP PT=X then use Fault Tolerance level #1, else if RTP PT=Y then use Fault Tolerance level #2. Here "RTP PT" denotes the RTP Packet Type number, where the different types have different tolerances for fault. Every RTP packet flowing in the session includes an RTP PT number that represents the media configuration associated with the packet. Such associations and mappings may be complex, which would be accounted for the XML document by listing the various properties or combinations of properties that defined a "media configuration" and defined the mapping of each media configuration to a corresponding fault tolerance. The XML document would include all the variants that may happen in the session.

In one example, the media configuration for EVS 13.2 kbps channel-aware mode could be detected or otherwise evaluated per the following pseudocode:

```
Step 1: Check RTP Payload Type Number in RTP header
    IF RTP PT = <the number that is defined in SDP for EVS codec> THEN
            The packet contains EVS encoded speech
            Go to step 2
    ELSE
            The packet does not contain EVS encoded speech
            Exit
    END
Step 2: Determine the RTP payload size
    IF RTP payload size is one of the sizes listed in 3GPP TS 26.445 v13.3.0 Table A.1
THEN
            The EVS Compact payload format is used
            Go to step 3
    ELSE
            The EVS Heather-Full payload format is used
            Go to step 4
    END
Step 3: Check RTP payload size
    IF payload size = 264 bits (33 bytes) THEN
            The EVS 13.2 kbps bit rate was used (however, it is still unknown whether the
channel-aware mode was used)
            Go to step 5
    ELSE
            Some other bitrate of the EVS codec was used, which cannot have channel-
aware mode
            Use Fault Tolerance level #1
            Exit
    END
Step 4: Extract the payload header from the RTP payload, extract the ToC from payload
header, and extract the Frame Type from ToC
    IF Frame Type = "000100" (binary) THEN
            The EVS 13.2 kbps bit rate was used (however it is still unknown
whether the channel-aware mode was used)
            Go to step 5
    ELSE
            Some other bitrate of the EVS codec was used, which cannot have
channel-aware mode
            Use Fault Tolerance level #1
            Exit
    END
```

-continued

```
Step 5: Extract [BW, CT, RF] index from the encoded speech bits (the EVS payload
format in 3GPP TS 26.445 Annex A describes where these bits can be found in the payload)
        IF RF flag = 1 THEN
                Extract RF frame offset from payload
                IF RF frame offset = 2, 3, 5 or 7 THEN
                        The EVS 13.2 kbps bitrate was used with the channel-aware mode
                        Use Fault Tolerance level #2
                ELSE
                        The EVS 13.2 kbps bitrate was used but not with the channel-aware
mode
                        Use Fault Tolerance level #1
                END
                Exit
        END
```

Note that the above description still only describes the variant that the EVS codec can create. The description would increase if one included all the variants that could be created using different RTP packetization options. As an example of the variations to be considered when contemplating the universe of possible media configurations, refer to 3GPP TS 26.114. Because the definition of a media configuration may be large, one approach contemplated herein involves the use of defined tags or index values, which could be used as a shorthand mechanism for identifying media configurations, and indicating to RAN nodes how to derive which media configuration is in use, based on detecting properties or contents of the (media) packets flowing in the session.

FIGS. 17-20 depict example processing modules that may be implemented at each of the respective nodes discussed herein, including the network nodes 20, 22, and 24, and the WCD 10.

Figure 17:
FIGS. 17-20 are block diagrams of example embodiments of processing modules implemented at various nodes or devices, in association with dynamically adjusting the service continuity threshold used for a multimedia session, and responding to or accommodating such adjustments.

FIG. 17, for example, depicts a network node 24 that is configured for operation in a wireless communication network, e.g., the network 14 introduced in FIG. 2. The network node 24 comprises: a receiving module 1700 configured to receive robustness information for a plurality of media configurations available for use in a multimedia session involving a wireless communication device 10 connected to the wireless communication network 14; a detecting module 1702 configured to detect, as a detected media configuration, which media configuration in the plurality of media configurations is in use for the multimedia session; a determining module 1704 configured to determine, from the robustness information, a fault tolerance of the detected media configuration; and a setting module 1706 configured to set a service continuity threshold in dependence on the fault tolerance of the detected media configuration, where the service continuity threshold is used for switching the multimedia session between a packet-switched transport and a circuit-switched transport.

Figure 18:
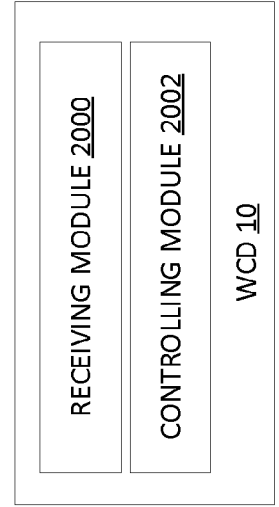

FIG. 18 depicts a network node 20 of an IMS 12. The network node 20 includes: a determining module 1800 that is configured to determine a plurality of media configurations available for use for a multimedia session involving a wireless communication device 10 connected to the IMS 12 via a wireless communication network 14; and an indicating module 1802 that is configured to indicate the available media configurations to a node 22 and/or 24 in a wireless communication network 14. The indicating module 1802 is further configured to indicate robustness information for the available media configurations. The robustness information enables the wireless communication network 14 to determine fault tolerances of the available media configurations and to set a service continuity threshold in dependence on the fault tolerance of whichever one of the media configurations is in use for the multimedia session. As noted, the service continuity threshold is used for deciding when to switchover the multimedia session between a packet-switched transport and a circuit-switched transport.

Figure 19:
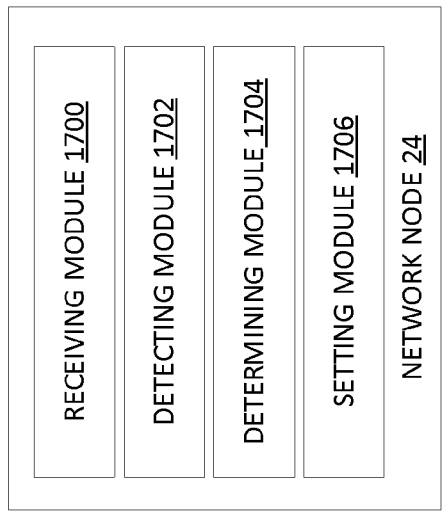

FIG. 19 illustrates an embodiment of a network node 22, e.g., operating as a PCRF in the wireless communication network 14 introduced in FIG. 2. The network node 22 includes a receiving module 1900 that is configured to receive information indicating a plurality of media configurations available for use in a multimedia session involving a wireless communication device 10 connected to the wireless communication network 14; a determining module 1902 that is configured to determine robustness information corresponding to the available media configurations, the robustness information indicating corresponding fault tolerances of the available media configurations; and a sending module 1904 that is configured to send the robustness information to another node 24 in the wireless communication network 14. Sending such information enables the other node 24 to set a service continuity threshold in dependence on the fault tolerance of the media configuration it detects as being in use for the multimedia session, the service continuity threshold used for switching the multimedia session between a packet-switched transport and a circuit-switched transport.

Figure 20:

FIG. 20 illustrates an embodiment of a wireless communication device 10 that includes a receiving module 2000 configured for receiving information from a wireless communication network 14 supporting a multimedia session involving the wireless communication device 10. The information indicates whether the wireless communication network 14 sets a service continuity threshold in dependence on which media configuration is in use for the multimedia session, wherein the media configuration in use is selected from a plurality of media configurations available for use for the multimedia session. Correspondingly, the wireless communication device 10 further includes a controlling module 2002 that is configured to control media configuration changes made or requested by the wireless communication device 10 during the multimedia session, in dependence on the information.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A network node configured for operation in a wireless communication network and comprising:
communication circuitry configured to communicatively couple the network node to one or more other nodes;
processing circuitry operatively associated with the communication circuitry and configured to:
receive robustness information for a plurality of media configurations available for use in a multimedia session involving a wireless communication device connected to the wireless communication network, the robustness information including an indicated level of fault tolerance of each media configuration of the plurality of media configurations;
detect, as a detected media configuration, which media configuration in the plurality of media configurations is in use for the multimedia session;
determine, from the robustness information, a fault tolerance of the detected media configuration by reading the indicated level of fault tolerance from the robustness information; and
set a service continuity threshold in dependence on the fault tolerance of the detected media configuration to a value that maps to the indicated level of fault tolerance according to mapping information known to the network node from predefined configuration information or from received signaling, the service continuity threshold used for switching the multimedia session between a packet-switched transport and a circuit-switched transport.

2. The network node of claim 1, wherein the network node is a radio network node in the wireless communication network that provides or controls a radio link connecting the wireless communication device to the wireless communication network.

3. The network node of claim 1, wherein the processing circuitry is configured to detect the media configuration in use on an ongoing basis, and to repeat the determine and set operations in response to the detected media configuration changing.

4. The network node of claim 1, wherein the processing circuitry is configured to receive the robustness information from an Internet Protocol Multimedia Subsystem (IMS) that is supporting the multimedia session, or from another network node operating as a Policy and Charging Rules Function (PCRF) for the wireless communication network.

5. The network node of claim 1, wherein the processing circuitry is configured to receive the robustness information as fault tolerance indicators corresponding to the plurality of media configurations, the fault tolerance indicators indicating corresponding levels of fault tolerance for the plurality of media configurations.

6. The network node of claim 1, wherein each media configuration comprises a Coder-Decoder (CODEC) configuration, and wherein the processing circuitry is configured to detect which media configuration is in use for the multimedia session by detecting which CODEC configuration is in use for the multimedia session, based on determining a Real-time Transport Protocol (RTP) payload type of packets flowing in the multimedia session, and mapping the RTP payload type to a corresponding CODEC configuration, according to mapping information that associates different RTP payload types with different CODEC configurations.

7. The network node of claim 1, wherein each media configuration comprises a Coder-Decoder (CODEC) configuration, and wherein the processing circuit is configured to detect which media configuration is in use for the multimedia session by detecting which CODEC configuration is in use for the multimedia session, based on determining a Frame Type (FT) identifier from payloads of Real-time Transport Protocol (RTP) packets flowing in the multimedia session, and mapping the FT identifier to a corresponding CODEC configuration, according to mapping information that associates different FT identifiers with different CODEC configurations.

8. The network node of claim 1, wherein each media configuration comprises a Coder-Decoder (CODEC) configuration, and wherein the processing circuitry is configured to detect which media configuration is in use for the multimedia session by detecting which CODEC configuration is in use for the multimedia session, based on detecting a size of packets flowing in the multimedia session, and mapping the size to a corresponding CODEC configuration, according to mapping information that associates different sizes with different CODEC configurations.

9. The network node of claim 1, wherein each media configuration comprises a redundancy configuration, and wherein the processing circuitry is configured to detect which media configuration is in use for the multimedia session by detecting which redundancy configuration is being used for packets flowing in the multimedia session.

10. The network node of claim 1, wherein the mapping information includes policy information that maps different media configurations to different settings of the service continuity threshold, wherein the policy information maps media configurations to service-continuity threshold settings, or to fault tolerance values, which in turn map to service-continuity settings.

11. The network node of claim 1, wherein the plurality of media configurations comprise a first media configuration that is not fault tolerant and a second media configuration that is fault tolerant, and wherein the processing circuitry is configured to set the service continuity threshold to a first level responsive to detecting that the first media configuration is in use, and set the service continuity threshold to a second level responsive to detecting that the second media configuration is in use, the second level allowing for a lower received signal quality at the wireless communication device as compared to the first level.

12. A network node configured for operation in an Internet Protocol Multimedia Subsystem (IMS), the network node comprising:
communication circuitry configured for communicating with a node in a wireless communication network; and
processing circuitry operatively associated with the communication circuitry and configured to:
determine a plurality of media configurations available for use for a multimedia session involving a wireless communication device connected to the IMS via the wireless communication network; and
indicate the available media configurations to the node in the wireless communication network, and
further indicate robustness information for the available media configurations the robustness information including an indicated level of fault tolerance of each media configuration of the available media configurations, thereby enabling the wireless communication network to determine fault tolerances of the available media configurations by reading the indicated level of fault tolerance from the robustness information, and to set a service continuity threshold in dependence on the fault tolerance of whichever one of the media configurations is in use for the multimedia session to a value that maps to the indicated level of fault tolerance according to mapping information known to the network node from predefined configuration information or from received signaling, said service continuity threshold used for deciding when to switchover the multimedia session between a packet-switched transport and a circuit-switched transport.

13. The network node of claim 12, wherein the processing circuitry is configured to indicate priorities for one or more of the available media configurations to one or more other nodes involved in negotiating which media configuration is selected for use for the multimedia session, to thereby bias media configuration selection according to the priorities.

14. A network node configured for operation in a wireless communication network, the network node comprising:
communication circuitry configured for communicating with a radio network node in the wireless communication network, the radio network node connecting a wireless communication device to the wireless communication network; and
processing circuitry operatively associated with the communication circuitry and configured to:
receive information indicating a plurality of media configurations available for use in a multimedia session involving the wireless communication device;
determine robustness information corresponding to the available media configurations, the robustness information indicating a corresponding level of fault tolerance for each of the available media configurations; and
send the robustness information to the radio network node, thereby enabling the radio network node to set a service continuity threshold in dependence on the fault tolerance of the media configuration it detects as being in use for the multimedia session by reading the indicated level of tolerance from the robustness information of the detected media configuration, the service continuity threshold being set to a value that maps to the indicated level of fault tolerance according to mapping information known to the network node from predefined configuration information or from received signaling, the service continuity threshold used for switching the multimedia session between a packet-switched transport and a circuit-switched transport.

15. A wireless communication device comprising:
communication circuitry configured to receive information from a wireless communication network supporting a multimedia session involving the wireless communication device, wherein the information indicates whether the wireless communication network sets a service continuity threshold in dependence on which media configuration is in use for the multimedia session, wherein the media configuration in use is selected from a plurality of media configurations available for use for the multimedia session; and
processing circuitry operatively associated with the communication circuitry and configured to control media configuration changes made or requested by the wireless communication device during the multimedia session, in dependence on the information.

16. The wireless communication device of claim 15, wherein the processing circuitry controls the media configuration changes made or requested by the wireless communication device during the multimedia session by determining whether to select a lower bitrate Enhanced Voice Service (EVS) Coder-Decoder (CODEC) or a channel-aware EVS CODEC, in dependence on whether the information indicates that the wireless communication network prioritizes the channel-aware EVS CODEC.

17. The wireless communication device of claim 15, wherein the processing circuitry is configured to determine that the wireless communication network sets the service continuity threshold in dependence on which media configuration is in use for the multimedia session, based on the information indicating priorities for one or more of the available media configurations.

* * * * *